US010832007B2

(12) United States Patent
Sahagun

(10) Patent No.: US 10,832,007 B2
(45) Date of Patent: Nov. 10, 2020

(54) SUGGESTION OF ALTERNATE USER INPUT USING A DIFFERENT USER INTERFACE

(71) Applicant: KYOCERA Document Solutions Inc., Osaka (JP)

(72) Inventor: Allan Sahagun, Oakland, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/698,739

(22) Filed: Nov. 27, 2019

(65) Prior Publication Data

US 2020/0097551 A1    Mar. 26, 2020

Related U.S. Application Data

(63) Continuation of application No. 16/529,046, filed on Aug. 1, 2019, now Pat. No. 10,534,864, which is a continuation of application No. 15/681,069, filed on Aug. 18, 2017, now Pat. No. 10,417,339.

(51) Int. Cl.
| G06F 40/30 | (2020.01) |
| G06F 3/0488 | (2013.01) |
| G06F 40/274 | (2020.01) |

(52) U.S. Cl.
CPC .......... *G06F 40/30* (2020.01); *G06F 3/04886* (2013.01); *G06F 40/274* (2020.01)

(58) Field of Classification Search
USPC .................................................. 704/1–504
See application file for complete search history.

(56) References Cited

U.S. PATENT DOCUMENTS

| 7,106,222 | B2* | 9/2006 | Ward | G06F 3/0202 |
| | | | | 200/512 |
| 8,487,751 | B2* | 7/2013 | Laitinen | G06F 3/044 |
| | | | | 340/407.2 |
| 8,564,541 | B2* | 10/2013 | Chou | G06F 3/04886 |
| | | | | 345/171 |
| 8,660,849 | B2* | 2/2014 | Gruber | G10L 15/1815 |
| | | | | 704/275 |
| 8,670,979 | B2* | 3/2014 | Gruber | G06F 9/54 |
| | | | | 704/9 |
| 8,706,503 | B2* | 4/2014 | Cheyer | G10L 15/265 |
| | | | | 704/275 |
| 8,731,942 | B2* | 5/2014 | Cheyer | G06F 40/30 |
| | | | | 704/275 |
| 8,799,000 | B2* | 8/2014 | Guzzoni | G06N 3/006 |
| | | | | 704/270.1 |
| 8,892,446 | B2* | 11/2014 | Cheyer | G06N 3/006 |
| | | | | 704/275 |

(Continued)

*Primary Examiner* — Marcus T Riley
(74) *Attorney, Agent, or Firm* — W. Eric Webostad

(57) ABSTRACT

Method(s) and apparatus(es) relating generally to an electronic device having a display and a touch-sensitive input device are disclosed. In such a method, a first keypad is displayed on the display. Obtained is sensed information from the touch-sensitive input device responsive to user input in association with the first keypad. The user input is determined to be for a second keypad different from the first keypad. A corresponding input to the user input is determined using the sensed information in association with the second keypad. The corresponding input is displayed on the display.

19 Claims, 21 Drawing Sheets

(56) References Cited

U.S. PATENT DOCUMENTS

| | | | | |
|---|---|---|---|---|
| 8,903,716 B2* | 12/2014 | Chen | G06N 5/022 | 704/9 |
| 8,930,191 B2* | 1/2015 | Gruber | G06F 40/30 | 704/257 |
| 8,942,986 B2* | 1/2015 | Cheyer | G06F 40/40 | 704/275 |
| 8,949,743 B2* | 2/2015 | Kida | G06F 3/0234 | 715/863 |
| 9,117,447 B2* | 8/2015 | Gruber | G10L 15/26 | |
| 9,318,108 B2* | 4/2016 | Gruber | G06F 16/3329 | |
| 9,368,114 B2* | 6/2016 | Larson | G06F 3/165 | |
| 9,535,643 B2* | 1/2017 | Waller | H04N 1/32106 | |
| 9,548,050 B2* | 1/2017 | Gruber | G06F 9/54 | |
| 9,620,104 B2* | 4/2017 | Naik | G10L 15/265 | |
| 9,697,822 B1* | 7/2017 | Naik | G10L 15/22 | |
| 9,760,559 B2* | 9/2017 | Dolfing | G06F 40/274 | |
| 9,842,101 B2* | 12/2017 | Wang | G06F 3/018 | |
| 9,858,925 B2* | 1/2018 | Gruber | G10L 15/18 | |
| 9,865,280 B2* | 1/2018 | Sumner | G06F 3/3344 | |
| 9,871,710 B2* | 1/2018 | Ha | H04L 43/0876 | |
| 9,922,642 B2* | 3/2018 | Pitschel | G10L 15/063 | |
| 9,966,060 B2* | 5/2018 | Naik | G10L 15/26 | |
| 9,966,065 B2* | 5/2018 | Gruber | G10L 15/1822 | |
| 10,067,938 B2* | 9/2018 | Bellegarda | G06F 40/289 | |
| 10,101,822 B2* | 10/2018 | Hatori | G06F 3/0237 | |
| 10,127,220 B2* | 11/2018 | Bellegarda | G06F 40/30 | |
| 10,176,167 B2* | 1/2019 | Evermann | G06F 40/35 | |
| 10,203,873 B2* | 2/2019 | Marsden | H03K 17/9622 | |
| 10,223,066 B2* | 3/2019 | Martel | G06F 3/167 | |
| 10,269,345 B2* | 4/2019 | Castillo Sanchez | G10L 15/22 | |
| 10,366,158 B2* | 7/2019 | Bellegarda | G06N 5/022 | |
| 10,417,339 B2* | 9/2019 | Sahagun | G06F 3/04886 | |
| 10,496,753 B2* | 12/2019 | Gruber | G10L 15/22 | |
| 10,567,477 B2* | 2/2020 | Sumner | G06F 3/167 | |
| 2009/0091479 A1* | 4/2009 | Sinha | G06F 3/016 | 341/22 |
| 2009/0265669 A1* | 10/2009 | Kida | G06F 3/0236 | 715/863 |
| 2010/0052880 A1* | 3/2010 | Laitinen | G06F 3/044 | 340/407.2 |
| 2010/0231523 A1* | 9/2010 | Chou | G06F 3/018 | 345/171 |
| 2011/0098056 A1* | 4/2011 | Rhoads | G09G 5/00 | 455/456.1 |
| 2011/0181514 A1* | 7/2011 | Aboulhosn | G06F 3/04886 | 345/169 |
| 2012/0165046 A1* | 6/2012 | Rhoads | G06F 3/005 | 455/456.3 |
| 2013/0335772 A1* | 12/2013 | Waller | H04N 1/32106 | 358/1.15 |
| 2014/0043240 A1* | 2/2014 | Chou | G06F 3/04886 | 345/171 |
| 2014/0344448 A1* | 11/2014 | Ha | H04L 43/0876 | 709/224 |
| 2015/0234591 A1* | 8/2015 | Park | G06F 1/1677 | 345/173 |
| 2017/0003876 A1* | 1/2017 | Marsden | G06F 3/023 | |
| 2017/0017393 A1* | 1/2017 | Luo | G06F 3/04845 | |
| 2019/0057080 A1* | 2/2019 | Sahagun | G06F 40/274 | |
| 2020/0097551 A1* | 3/2020 | Sahagun | G06F 40/274 | |

\* cited by examiner

SUGGESTION OF ALTERNATE USER INPUT USING A DIFFERENT USER INTERFACE

CROSS-REFERENCE TO RELATED APPLICATIONS

The present application is a continuation of U.S. patent application Ser. No. 16/529,046, filed Aug. 1, 2019, which is a continuation of U.S. patent application Ser. No. 15/681,069, filed Aug. 18, 2017 (now U.S. Pat. No. 10,417,339), the disclosure of each of which is incorporated herein by reference in its entirety for all purposes consistent herewith.

FIELD

The following description relates to a user interface. More particularly, the following description relates to suggestion of alternate user input using a different user interface displayed on a display and input with a touch-sensitive input device.

BACKGROUND

People sometimes type on a displayed user interface without changing a keypad from numbers to characters, or vice versa. The typed text in some instances may not make any sense, as it appears as gibberish. In the past this meant a user had to delete all he/she has typed with the incorrect keypad, change the keypad, and then retype their intended input. Along those lines, a user typing on an incorrect keypad displayed on a display in association with a touch-sensitive input device would have to manually correct the incorrect entry or entries, as only gibberish was in effect entered. Then, the user would have to manually delete the gibberish entry and replace same by typing using a correct keypad displayed on such a display.

SUMMARY

A method relates generally to an electronic device having a display and a touch-sensitive input device. In such a method, a first keypad is displayed on the display. Obtained is sensed information from the touch-sensitive input device responsive to user input in association with the first keypad. The user input is determined to be for a second keypad different from the first keypad. A corresponding input to the user input is determined using the sensed information in association with the second keypad. The corresponding input is displayed on the display.

An apparatus relates generally to a user interface. In such an apparatus, a display is operable to display the user interface including a first keypad. A touch-sensitive input device is aligned to the display. Storage is configured to store sensed information from the touch-sensitive input device corresponding to first keys of the first keypad for receipt of a user input. A programmed processor is configured to: determine the sensed information corresponds to second keys of a second keypad; and determine a corresponding input for the user input in association with second keys of the second keypad using the sensed information.

A method relates generally to a programmed electronic device having a display and a touch-sensitive input device. In such a method, a keypad app is installed in the programmed electronic device. The keypad app includes instructions to configure the programmed electronic device for: obtaining sensed information for a user input provided via the touch-sensitive input device in association with first keys of a first keypad on the display; determining the user input to be for a second keypad different from the first keypad; associating the sensed information with second keys of the second keypad to obtain a representation of the user input; referencing the representation against a dictionary associated with the second keypad; and displaying the representation on the display as a corresponding input to the user input for user selection.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-2 is block diagram depicting an exemplary portable communication device.

FIG. 2 is a flow diagram depicting an exemplary keypad mode app flow.

FIGS. 3-1, 3-2 and FIG. 4 are pictorial diagrams depicting alternate progressions of a screen image corresponding to an example of a keypad mode app flow of FIG. 2.

FIGS. 5-1 through 5-5 are pictorial diagrams depicting alternate progressions of a screen image corresponding to an example of a keypad mode app flow of FIG. 2.

FIGS. 7-1 and 7-2 are flow diagrams depicting an exemplary keypad app use flow.

FIGS. 10-1 through 10-4 are pictorial diagrams depicting an exemplary multi-function printer ("MFP") display having a touch screen with user interfaces respectively displayed.

DETAILED DESCRIPTION

Figure 1:
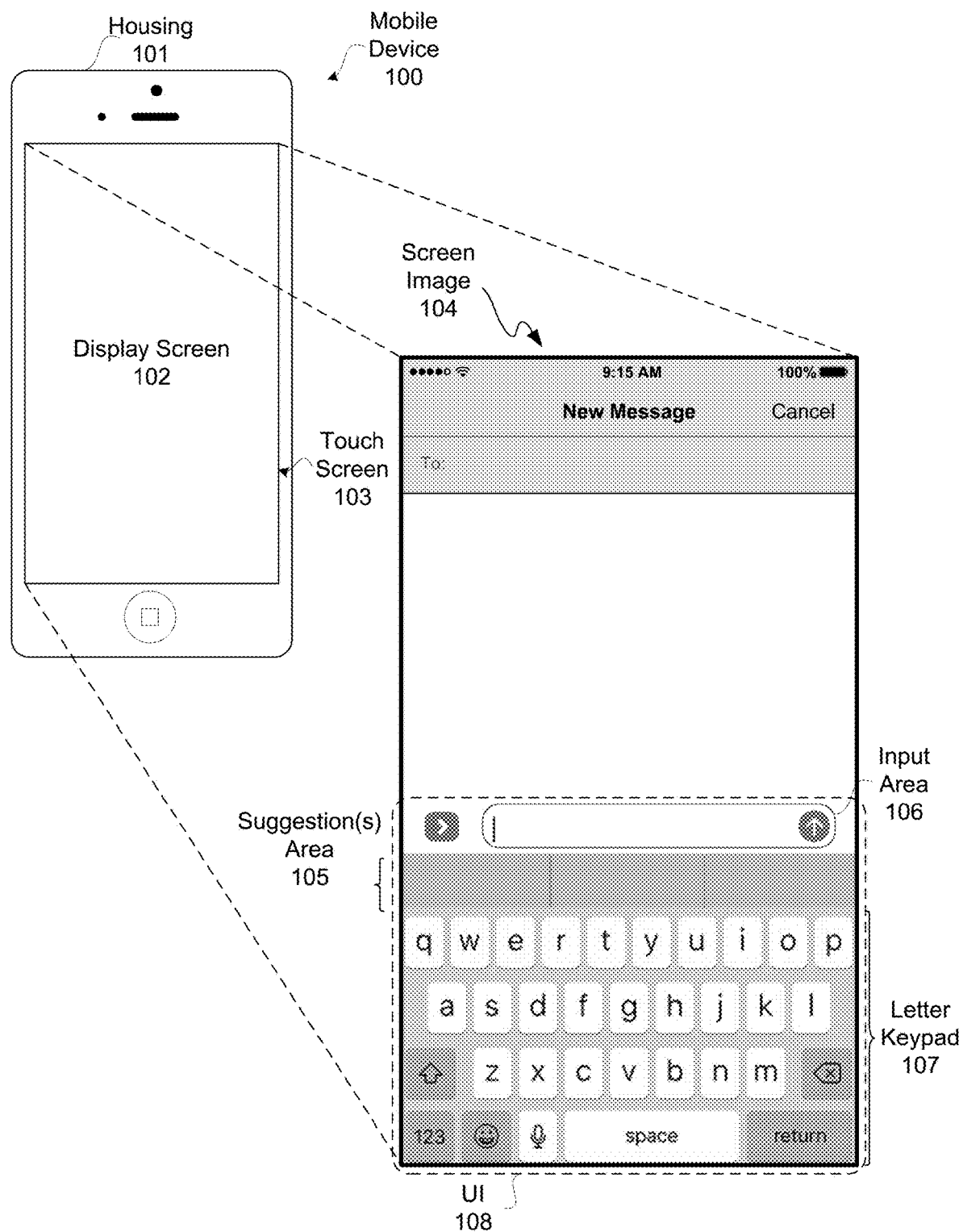
FIG. 1-1 is a pictorial diagram depicting an exemplary screen image of a display screen of a mobile device.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, the order of these operations may differ from what is depicted. Also two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

Before describing the examples illustratively depicted in the several figures, a general introduction is provided to further understanding.

When inputting information via a user interface displayed on a display associated with a touch sensitive input device, a user may not recognize that the displayed user interface, such as a keypad or a keyboard, is incorrect for such user's intended input. This results in an error in the user's displayed input, even though the user may have a correct input though for a different user interface.

To avoid having to manually determine and correct errors associated with a user input from an incorrect user interface, a correct user interface may be determined in order to obtain an intended representation of a user. A suggested change may be automatically generated saving a user time.

With the above general understanding borne in mind, various configurations for obtaining a correct user interface and generating one or more representations of a user input for such correct user interface are generally described below.

FIG. 1-1 is a pictorial diagram depicting an exemplary screen image 104 of a display screen 102 of a mobile device 100. In this example, mobile device 100 is a mobile phone; however, it will be appreciated from the following description that touch screen devices, including but not limited to mobile phones, or other electronic devices with touch screens may benefit from technology described herein.

Mobile device 100 includes a housing 101, a touch screen 103, and a display screen 102. A combination of a touch screen 103 and a display screen 102 is well-known, and thus not described herein in unnecessary detail.

Display screen 102 may be used for displaying a screen image 104 including a user interface ("UI") 108. In this example, screen image 104 is in a portrait orientation; however, a landscape orientation may likewise be used. Moreover, in this example, user interface 108 is for a mobile phone; however, in another example, user interface 108 may be a printer user interface or some other electronic device interface.

Figures 1, 2:
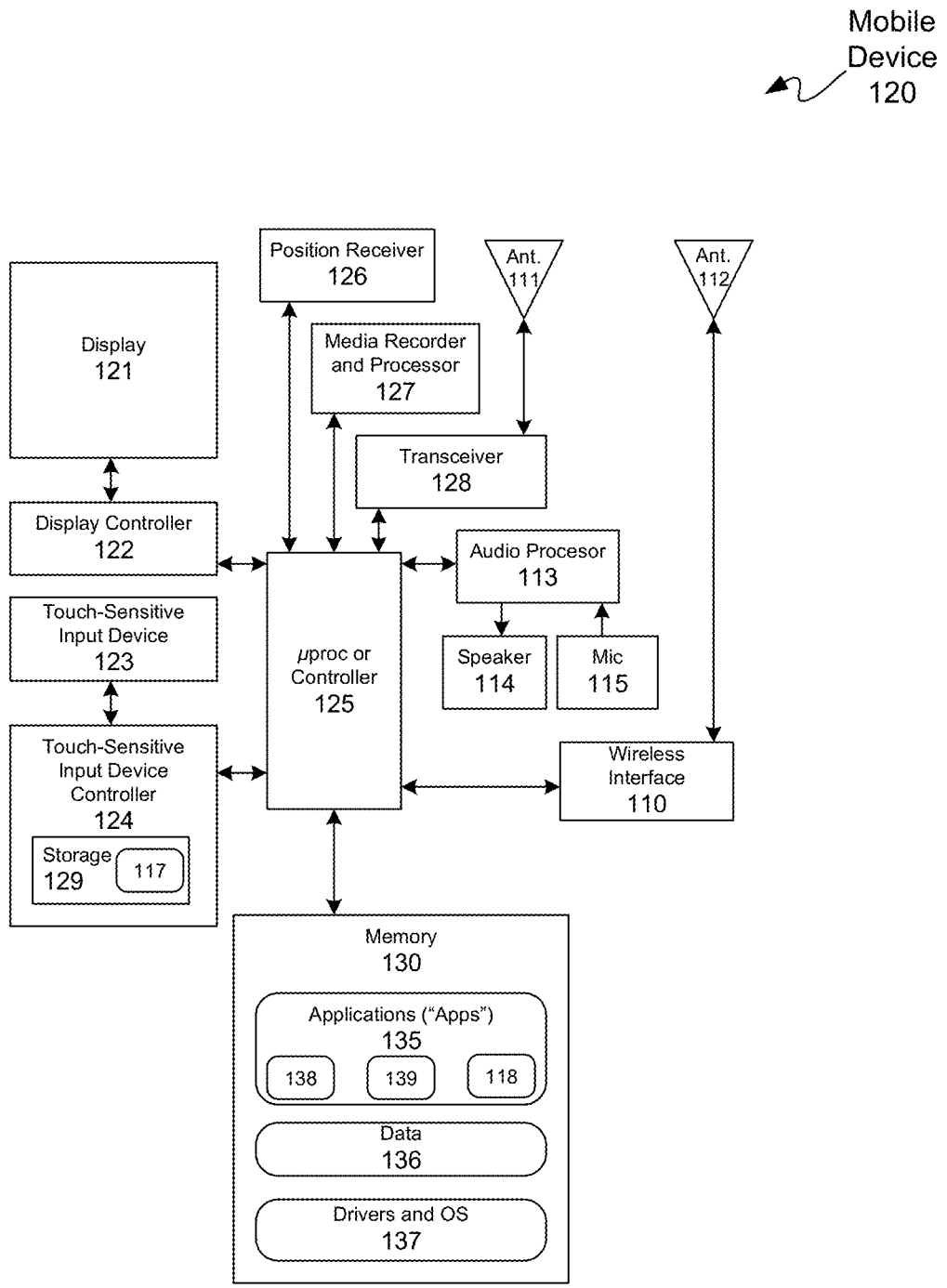
Figure 2:
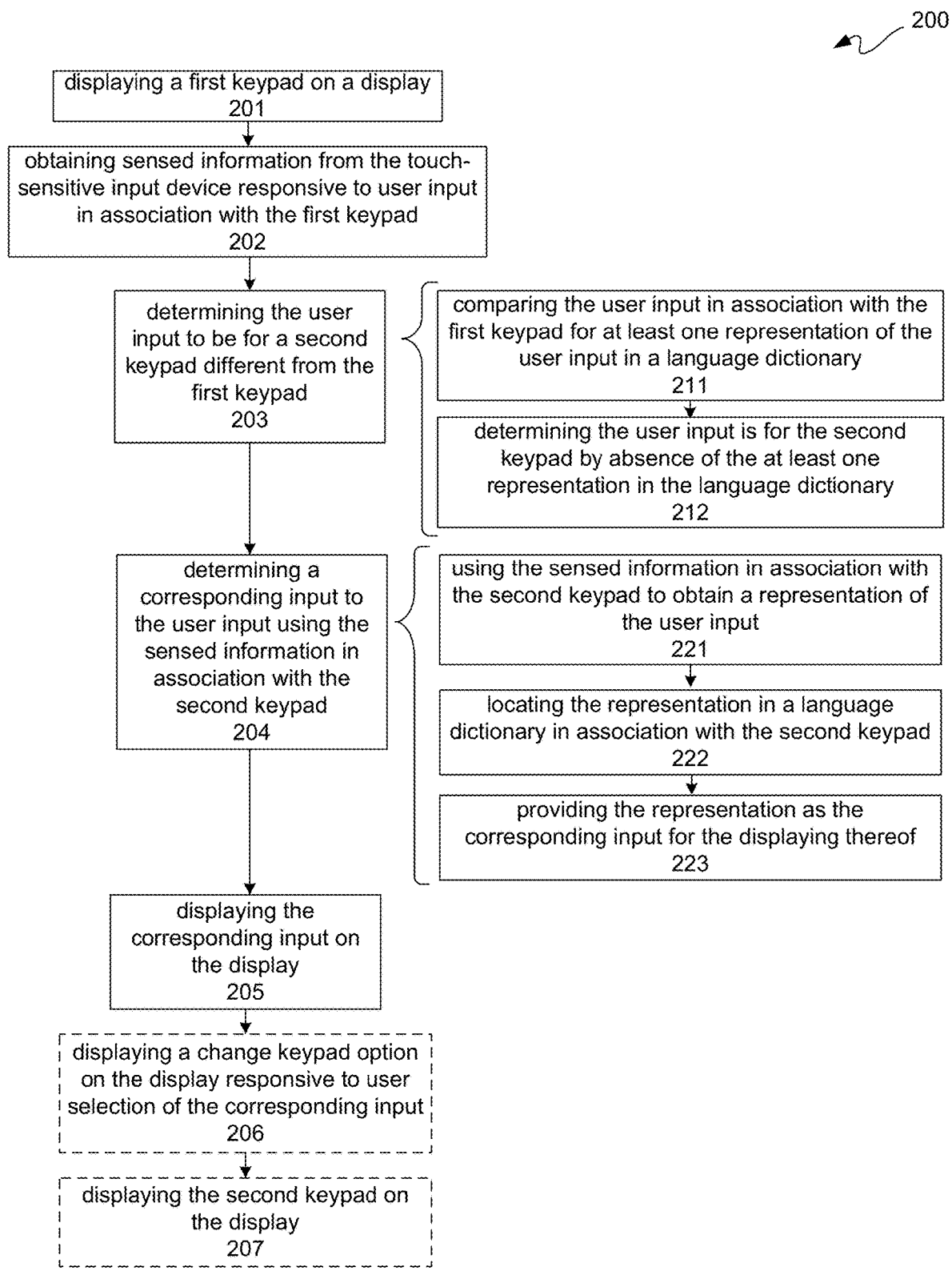

FIG. 1-2 is block diagram depicting an exemplary portable communication device ("mobile device") 120. Mobile device 120 may include a wireless interface 110, an antenna 111, an antenna 112, an audio processor 113, a speaker 114, and a microphone ("mic") 115, a display 121, a display controller 122, a touch-sensitive input device 123, a touch-sensitive input device controller 124, a microprocessor or microcontroller 125, a position receiver 126, a media recorder 127, a cell transceiver 128, and a memory or memories ("memory") 130.

Because one or more of the examples described herein may be implemented in a mobile phone, a detailed description of an example mobile phone system is provided. However, it should be understood that other configurations of touch screen devices may benefit from the technology described herein.

Microprocessor or microcontroller 125 may be programmed to control overall operation of mobile device 120. Microprocessor or microcontroller 125 may include a commercially available or custom microprocessor or microcontroller.

Memory 130 may be interconnected for communication with microprocessor or microcontroller 125 for storing programs and data used by mobile device 120. Memory 130 generally represents an overall hierarchy of memory devices containing software and data used to implement functions of mobile device 120.

Memory 130 may include, for example, RAM or other volatile solid-state memory, flash or other non-volatile solid-state memory, a magnetic storage medium such as a hard disk drive, a removable storage media, or other suitable storage means. In addition to handling voice communications, mobile device 120 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 130 stores drivers, such as I/O device drivers, and operating system programs ("OS") 137. Memory 130 stores application programs ("apps") 135 and data 136. Data may include application program data.

I/O device drivers may include software routines accessed through microprocessor or microcontroller 125 or by an OS stored in memory 130. Apps, to communicate with devices such as the touch-sensitive input device 123 and keys and other user interface objects adaptively displayed on a display 121, may use one or more of such drivers. For example, a driver may be used for communication from keys of a user interface displayed on display 121 associated with touch zones of touch sensitive input device 123. Moreover, drivers may be used for other actual or virtual input/output ports of mobile device 120.

Mobile device 120, such as a mobile or cell phone, includes a display 121. Display 121 may be operatively coupled to and controlled by a display controller 122, which may be a suitable microcontroller or microprocessor programmed with a driver for operating display 121.

Touch-sensitive input device 123 may be operatively coupled to and controlled by a touch-sensitive input device controller 124, which may be a suitable microcontroller or microprocessor. For example, touch-sensitive input device may be a haptic input device, a pressure-sensitive input device, or some other touch-sensitive input device.

Along those lines, touching activity input via touch-sensitive input device 123 may be communicated to touch-sensitive input device controller 124. Touch-sensitive input device controller 124 may optionally include local storage 129 for storing locations or touch zones or other sensed information 117 associated with touching activity input. In another example, sensed information 117 may be stored in memory 130.

Touch-sensitive input device controller 124 may be programmed with a driver or application program interface ("API") for output of sensed information 117 to an app 118 of apps 135. In another example, app 118 may be incorporated into OS 137. As described below in additional detail, app 118 is a keypad mode app.

In an example, touch-sensitive input device 123 is configured to facilitate touch input functionally, namely detection of user touch of an upper surface of display 121 and touch-sensitive input device 123 combination and recognition of user input based on locations of such touching activity. Such touching activity may be discrete touches and/or swipes, the latter of which may be used to input multiple letters without lifting a finger from an upper surface of display 121 associated with a touch-sensitive input device 123. Further, touch-sensitive input device controller 124 may be configured to provide haptic feedback features associated with such touch-sensitive input device 123. Functionality of touch-sensitive input device controller 124 may be carried out via dedicated hardware, firmware, software, or combinations thereof.

With continued reference to FIG. 1-2, microprocessor or microcontroller 125 may be programmed to interface directly via touch-sensitive input device 123 or through touch-sensitive input device controller 124. Microprocessor or microcontroller 125 may be programmed or otherwise configured to interface with one or more other interface device(s) of mobile device 120. Microprocessor or microcontroller 125 may be interconnected for interfacing with a transmitter/receiver ("transceiver") 128, audio processing circuitry, such as an audio processor 113, and a position receiver 126, such as a global positioning system ("GPS") receiver. An antenna 111 may be coupled to transceiver 128 for bi-directional communication, such as cellular and/or satellite communication.

Mobile device 120 may include a media recorder and processor 127, such as a still camera, a video camera, an audio recorder, or the like, to capture digital pictures, audio and/or video. Microprocessor or microcontroller 125 may be interconnected for interfacing with media recorder and processor 127. Image, audio and/or video files corresponding to the pictures, songs and/or video may be stored in memory 130 as data 136.

Mobile device 120 may include an audio processor 113 for processing audio signals, such as for example audio information transmitted by and received from transceiver 128. Microprocessor or microcontroller 125 may be interconnected for interfacing with audio processor 113. Coupled to audio processor 113 may be one or more speakers 114 and one or more microphones ("mic") 115, for projecting and receiving sound, including without limitation recording sound, via mobile device 120. Audio data may be passed to audio processor 113 for playback. Audio data may include, for example, audio data from an audio file stored in memory 130 as data 136 and retrieved by microprocessor or microcontroller 125. Audio processor 113 may include buffers, decoders, amplifiers and the like.

Mobile device 120 may include one or more local wireless interfaces 110, such as a WiFi interface, an infrared transceiver, and/or an RF adapter. Wireless interface 110 may provide a Bluetooth adapter, a WLAN adapter, an Ultra-Wideband ("UWB") adapter, and/or the like. Wireless interface 110 may be interconnected to an antenna 112 for communication. As is known, a wireless interface 110 may be used with an accessory, such as for example a hands-free adapter and/or a headset. For example, audible output sound corresponding to audio data may be transferred from mobile device 120 to an adapter, another mobile radio terminal, a computer, or another electronic device. In another example, wireless interface 110 may be for communication within a cellular network or another Wireless Wide-Area Network ("WWAN").

Again, in this example, mobile device 120 is a mobile phone; however, it will be appreciated from the following description that touch screen devices, including but not limited to mobile phones, printers, or other electronic devices with touch screens may benefit from technology described herein. Though portable devices with touch screens are described herein, it should be understood that other electronic devices with touch screens generally not intended to be portable devices may benefit from technology described herein.

As mobile device 120 of FIG. 1-2 may be an example of mobile device 100 of FIG. 1-1, for purposes of clarity by way of example and not limitation, it shall be assumed that mobile device 100 and 120 are one and the same, namely hereinafter "mobile device 100." Along those lines, mobile device 100 is further described with simultaneous reference to FIGS. 1-1 and 1-2.

A display 121 may be physically coupled to housing 101 operable to display a user interface 108 including a keypad 107. User interface 108 may include a suggestion(s) area 105 and a user input area 106 in addition to keypad 107. In the example illustratively depicted, keypad 107 is a letter keypad 107 for English. However, in another example a different keypad may be used, such as a numbers keypad, a symbols keypad, a non-English letter or symbol keypad, or some other keypad. However, for purposes of clarity, it shall be assumed that an English letter keypad 107 is displayed unless otherwise indicated hereinbelow.

Touch-sensitive input device 123 may be aligned to display 121. Storage 129 may be configured to store sensed information 117 input from touch-sensitive input device 123 corresponding to keys of keypad 107 for receipt of a user input, which may be displayed in input area 106.

Microprocessor or microcontroller 125 may be programmed or otherwise configured to determine whether sensed information 117 corresponds to keys of another keypad different from English letter keypad 107. In response to a determination that sensed information 117 corresponds to keys of another keypad different from English letter keypad 107, microprocessor or microcontroller 125 may be programmed or otherwise configured to determine a corresponding input for such a user input in association with corresponding keys of such other keypad using sensed information 117.

Microprocessor or microcontroller 125 may be programmed or otherwise configured to cause a corresponding input, namely such a user input but for such other keypad, to be displayed on display screen 102 of display 121. Such corresponding input or corresponding inputs may be displayed in suggestion(s) area 105. One or more corresponding inputs may be displayed in suggestion(s) area 105 as alternatives to an original user input. Such one or more corresponding inputs may prompt a user to acknowledge that a keypad displayed while such user input was input was not the intended keypad to be used by the user for such user input. Microprocessor or microcontroller 125 may be programmed or otherwise configured to cause such other keypad to be displayed on display screen 102 of display 121 responsive to user selection of a corresponding input.

To determine whether sensed information 117 corresponds to keys of another keypad, namely a keypad other than one displayed on display 121 when such user input was input, microprocessor or microcontroller 125 may be programmed or otherwise configured to compare a current user input in association with a currently displayed keypad for a representation of such user input in a language dictionary 138, which may be stored in memory 130, corresponding to or associated with such displayed keypad. Microprocessor or microcontroller 125 may be programmed or otherwise configured to determine whether such user input is in association with another keypad, namely not a currently displayed keypad during such user input, by absence of any representation, including any probable representation, in such language dictionary 138 associated with such currently displayed keypad.

To determine a corresponding input for a user input in association with other keys of another keypad using sensed information 117, microprocessor or microcontroller 125 may be programmed or otherwise configured to use sensed information 117 in association with such other keypad to obtain a representation, including without limitation a probable representation, of such a user input. Microprocessor or microcontroller 125 may be programmed or otherwise configured to search for such a representation in another language dictionary 139 in association with such other keypad. Microprocessor or microcontroller 125 may be programmed or otherwise configured to provide such representation as a corresponding input to such user input for displaying thereof responsive to locating such a representation in language dictionary 139.

With the above description borne in mind, examples of keypad mode app 118 are described below.

FIG. 2 is a flow diagram depicting an exemplary keypad mode app flow 200. Again, for purposes of clarity by way of example and not limitation, it shall be assumed that keypad mode app flow 200 is for a portable device, such as a mobile phone for example, having a display 121 and a touch-sensitive input device 123, such as previously described for example with reference to FIG. 1-2. However, a stationary electronic device or a portable device, including without limitation other than a mobile phone, such as an electronic pad for example, may benefit from technology described herein.

At operation 201, a first keypad may be displayed on a display. At operation 202, sensed information 117 may be obtained from a touch-sensitive input device responsive to user input in association with such a first keypad. Sensed information 117 may include location information for such user input in association with such a first keypad in relation to a touch-sensitive input device of a portable device.

At operation 203, such user input may be determined to be for a second keypad different from such a first keypad. Operation 203 may include operations 211 and 212.

Along those lines, a determination that a current user input is for a second keypad may include at operation 211 comparing such current user input in association with such a first keypad to one or more representations, including for exact and probable representations, in a language dictionary for at least one representation corresponding to such user input in such language dictionary.

A keypad, such as for example an English, Japanese, or other keypad, may be associated with a language dictionary. A portable device may be localized for a language, but may be configured to switch between different languages. This association between a keypad and a language dictionary may be referred to as a language mode. However, a keypad may be associated with symbols other than language symbols, such as described below for example in additional detail.

At operation 212, it may be determined that such a user input is for a second keypad, namely a keypad other than a displayed keypad during input of such user input, by absence of at least one representation of such user input in such language dictionary.

At operation 204, a corresponding input to such user input may be determined using sensed information 117 in association with such a second keypad. Operation 204 may include operations 221 through 223.

At operation 221, sensed information 117 may be used in association with a second keypad to obtain a representation of such user input. At operation 222, such representation may be located in a language dictionary in association with such second keypad. For example, a search of a language dictionary associated with such second keypad may be performed for one or more representations, including an exact match or a probable match, of such user input for such second keypad, and from such search, such one or more representations of such user input may be found. A probable match may take into account one or more factors, such as a typographical error, a misspelling, a context, or one or more other factors.

At operation 223, such located representation may be provided as a corresponding input to such user input for displaying on a display of a portable device. At operation 205, such a corresponding input may be displayed on a display of such a portable device.

Optionally, at operation 206, a change keypad option may be displayed on a display of a portable device responsive to user selection of such a corresponding input. Optionally, as part of operation 206 or as a separate optional operation 207, such a second keypad may be displayed on a display of a portable device. This display of a second keypad may be responsive to user selection of a change keypad option or a corresponding input.

For purposes of clarity by way of example and not limitation, FIGS. 3-1, 3-2 and FIG. 4 are pictorial diagrams depicting alternate progressions of a screen image corresponding to an example of a keypad mode app flow 200 of FIG. 2. Along those lines, a keypad app 118 may be installed by a portable device manufacturer, reseller, user or other entity. Such a keypad app 118 may include instructions to configure a programmed portable device to perform operations as follows.

With reference to screen image 310, a user input 312 may be provided via touch-sensitive input device in association with first keys of a first keypad, which in this example is a number-symbol keypad 311, displayed on a display. Such user input 312 may be displayed in an input area 106 of a user interface. As illustratively depicted, user input 312 is gibberish, which in this example is ")3@@9"; however, in another example user input 312 may be some other string of characters.

Sensed information 117 for such a user input may be obtained. In response to sensed information 117, it may be determined that user input 312 was intended to be for a second keypad, such as letter keypad 107 for example, different from first keypad 311. Along those lines, sensed information 117 may be associated with second keys of a second keypad, such as letter keypad 107 for example, to obtain a representation of user input 312.

Such representation may be referenced against a dictionary associated with such a second keypad, such as letter keypad 107 for example, to obtain at least one corresponding input 303. In this example, possible corresponding inputs 303 to gibberish ")3@@9" are "Hello", "Hecko" and "Help". Corresponding inputs 303 may be displayed in screen image 310 in a suggestion(s) area 105 of a user interface. Optionally, one or more of corresponding input(s) 305, which may include one or more of corresponding inputs 303, may optionally be displayed on a suggestions bar 304. In this example, possible corresponding inputs 305 to gibberish ")3@@9" are "Hello", "Heck" and "Heiko".

Figures 1, 3:
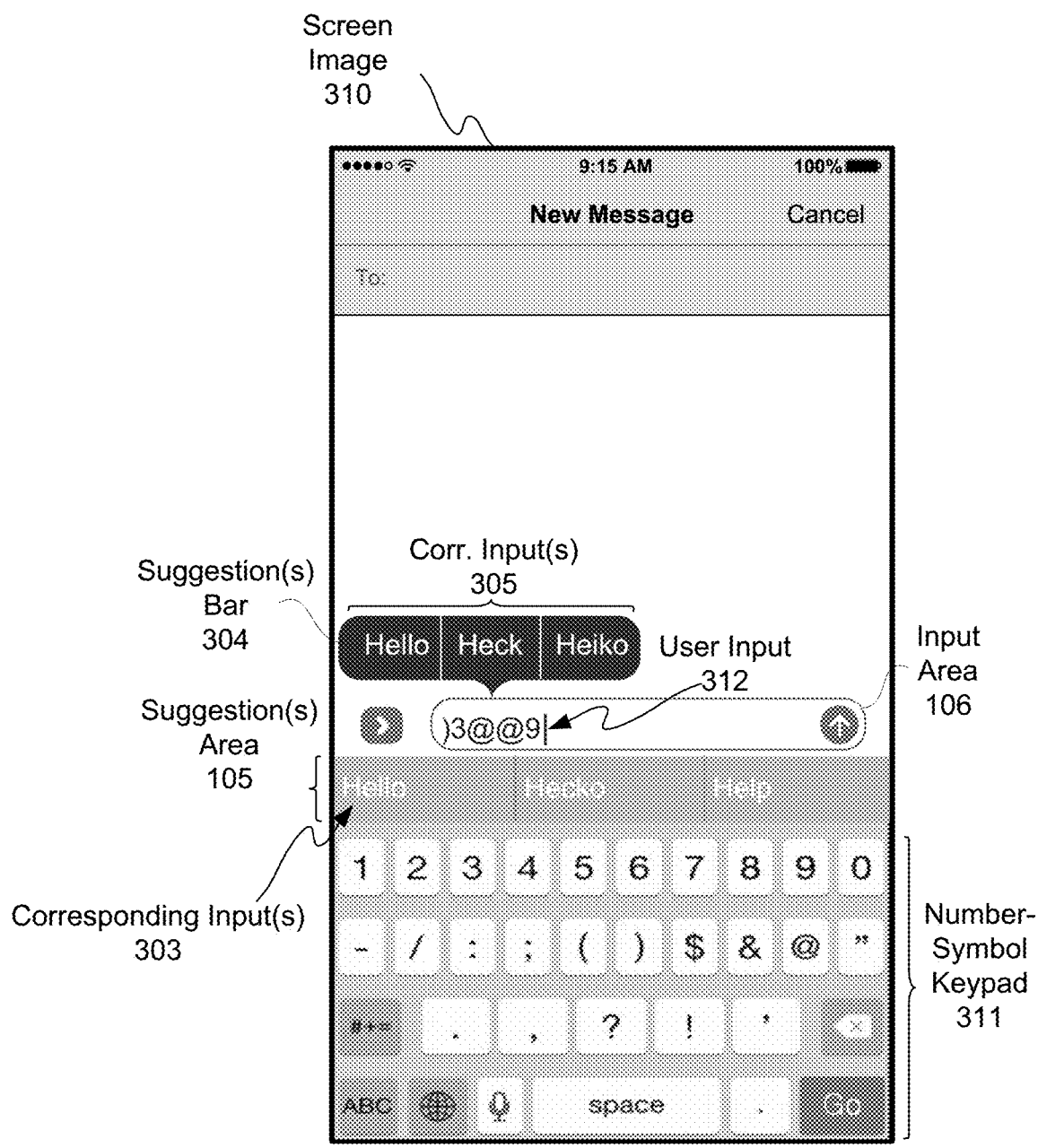
Figures 2, 3:
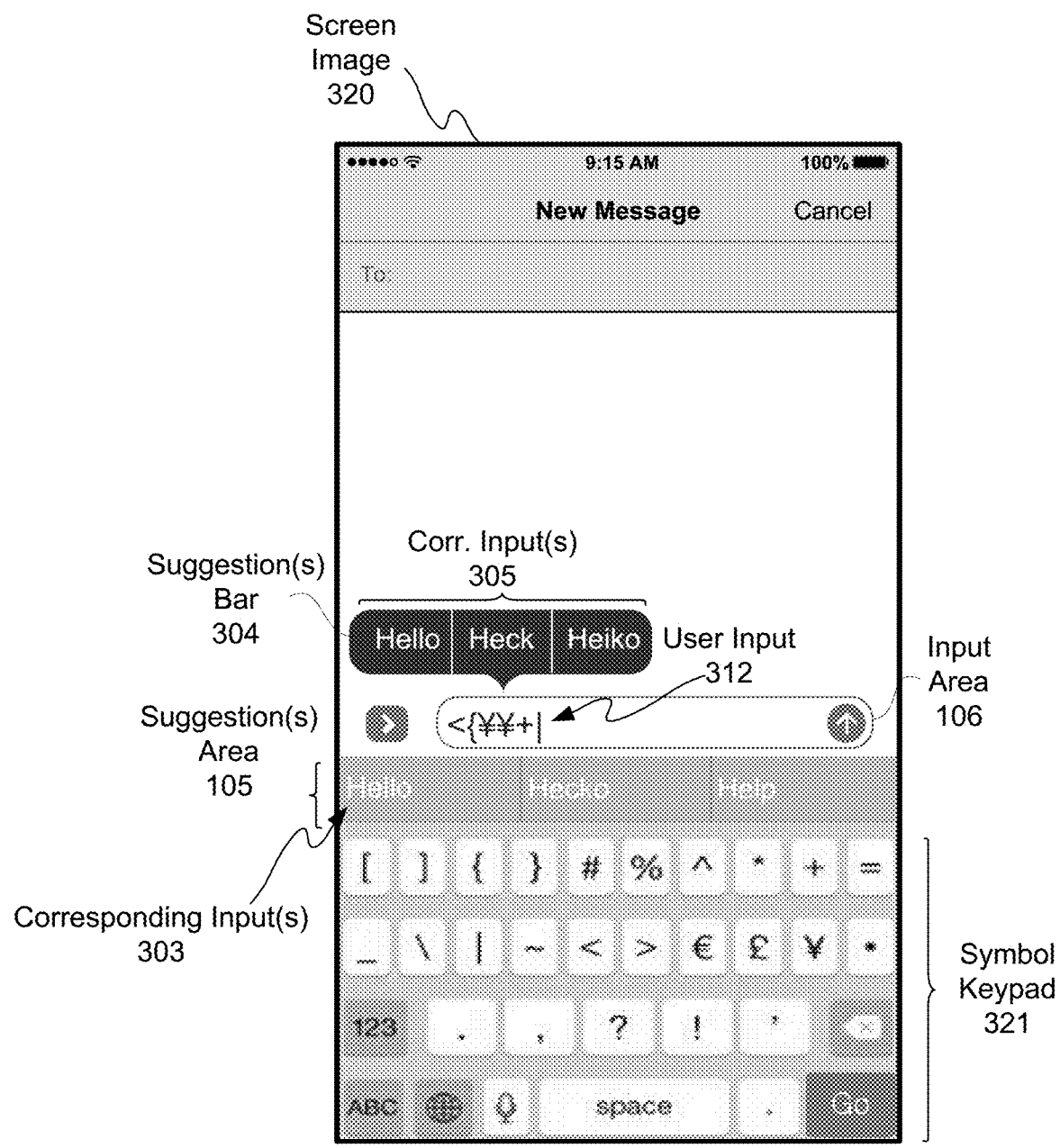

FIG. 3-2 is the same as FIG. 3-1, except rather than a number-symbol keypad 311, a symbol keypad 321 is displayed. Thus, with reference to screen image 320, for a same user input 312, a different gibberish, which in this example is "<{¥¥+|", results. However, when associated with letter keypad 107, one or more same corresponding inputs 303 and/or 305 may be obtained and displayed.

Figure 4:
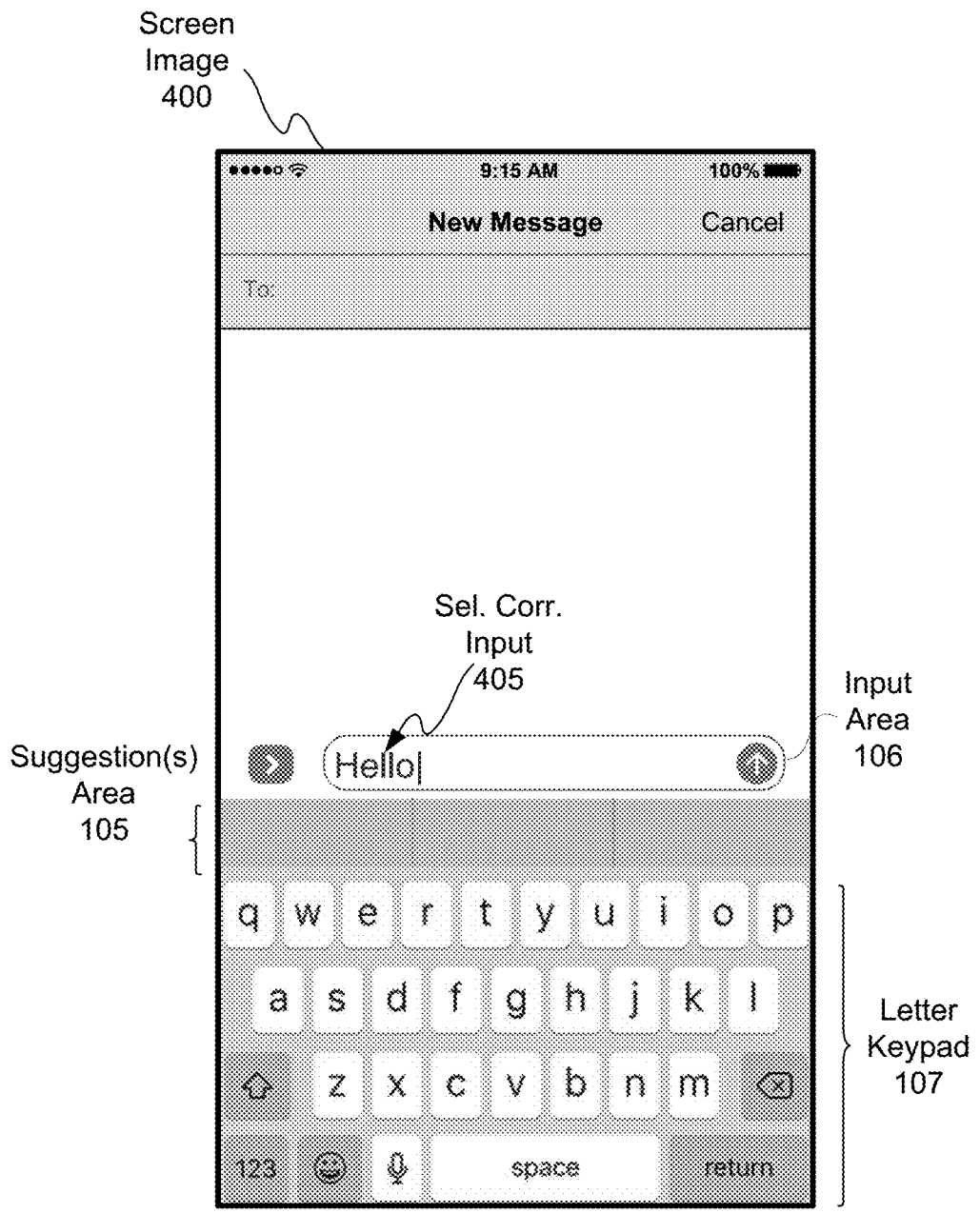

With reference to screen image 400 of FIG. 4, a user selected corresponding input 405 may be displayed in input area 106. Thus, a representation of user input 312 may be displayed as a corresponding input to such user input for user selection, and responsive to selection, such user selected corresponding input 405 may be displayed in input area 106. Optionally, responsive to user selection of a corresponding input 405, a second keypad used to obtain such corresponding input 405 may be displayed on a user interface. In this example, such second keypad is letter keypad 107.

Figures 1, 5:
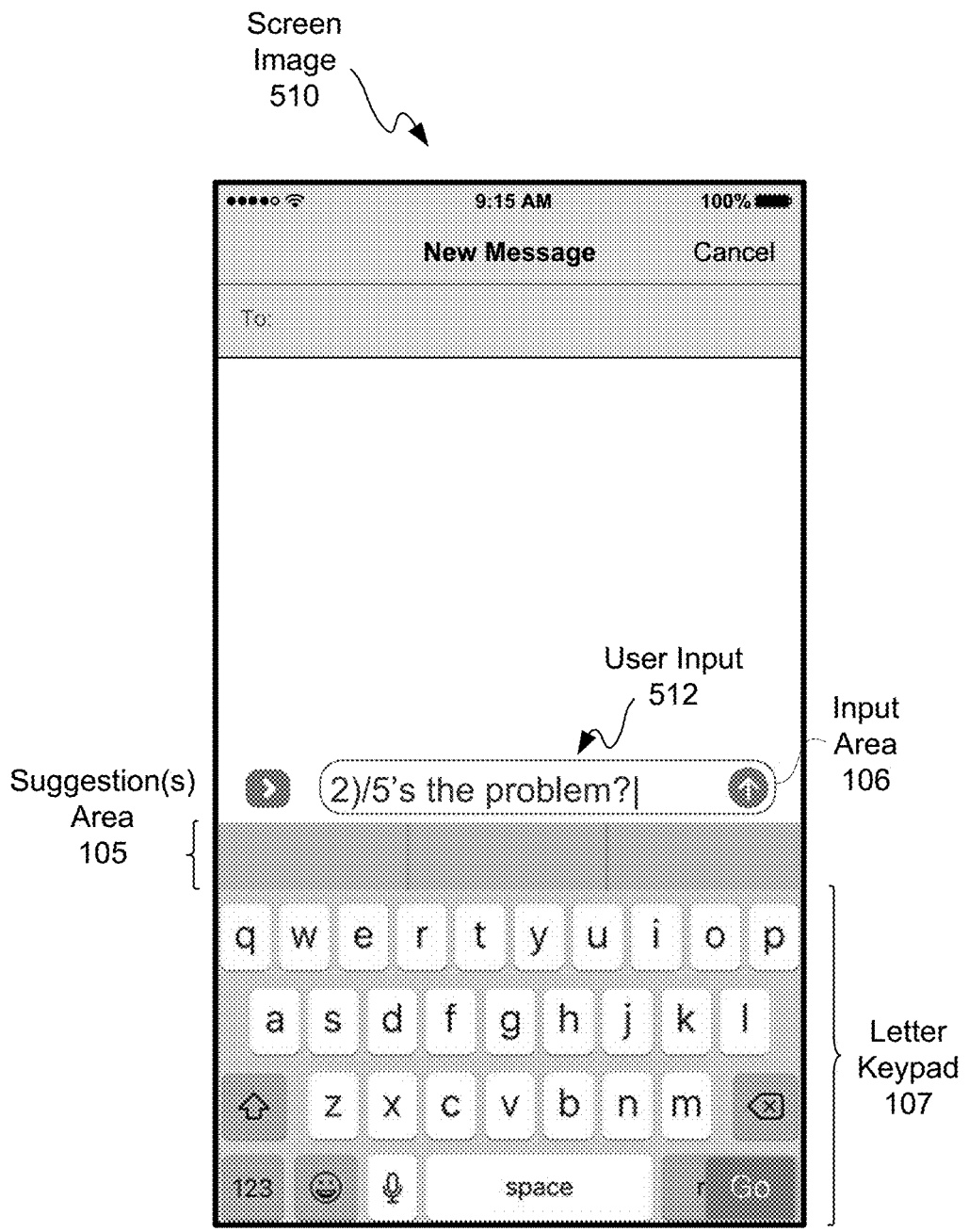
Figures 2, 5:
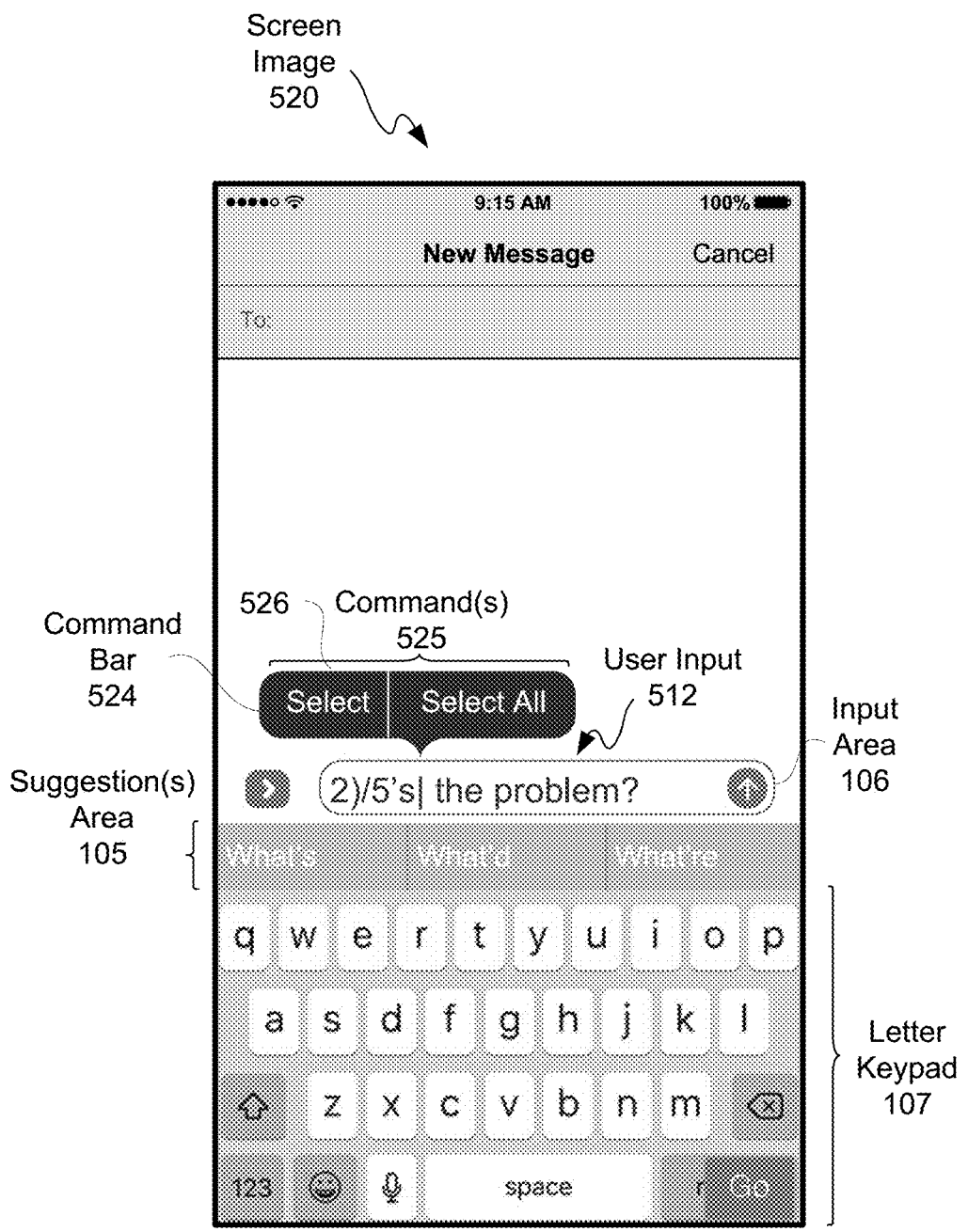
Figures 3, 5:
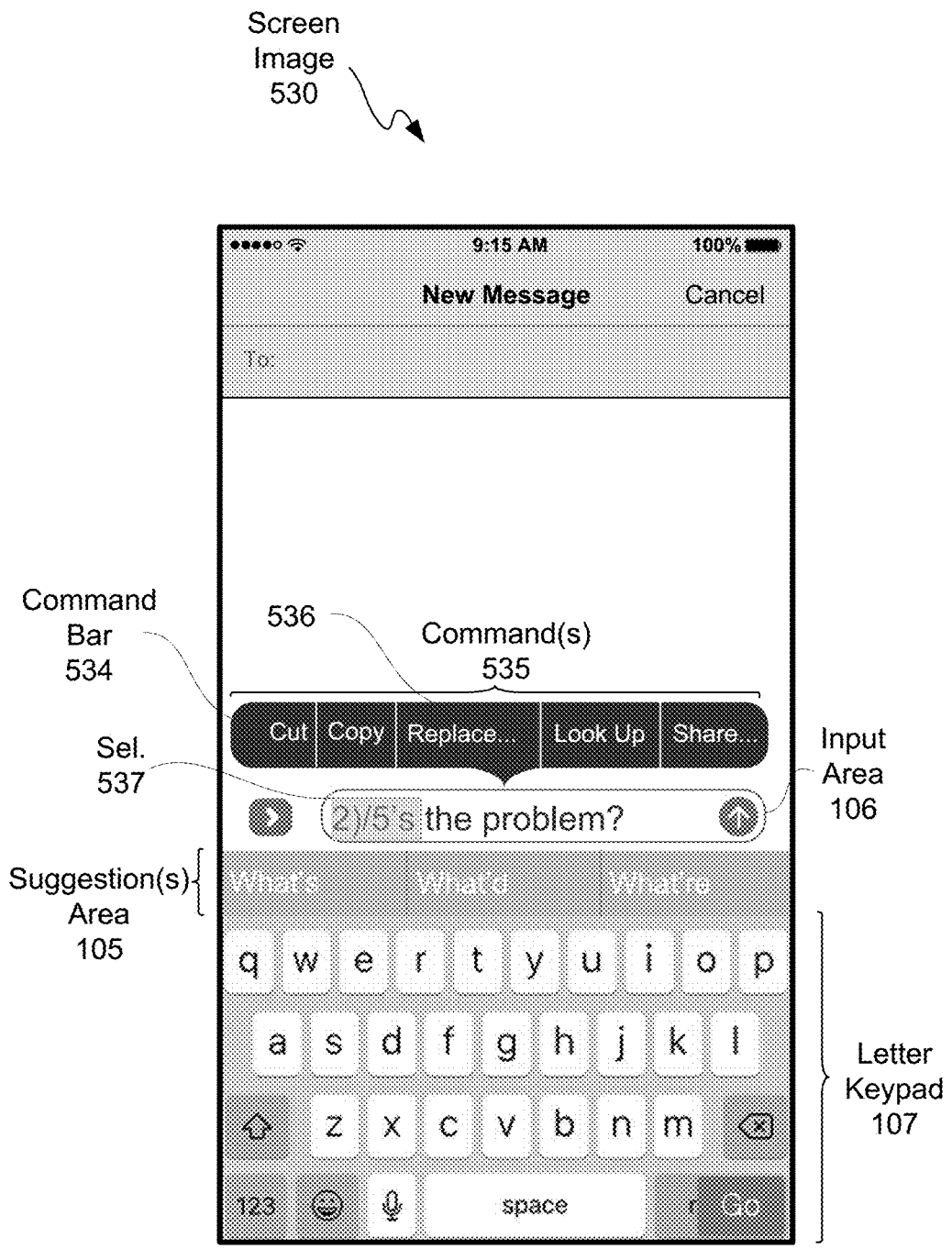
Figures 4, 5:
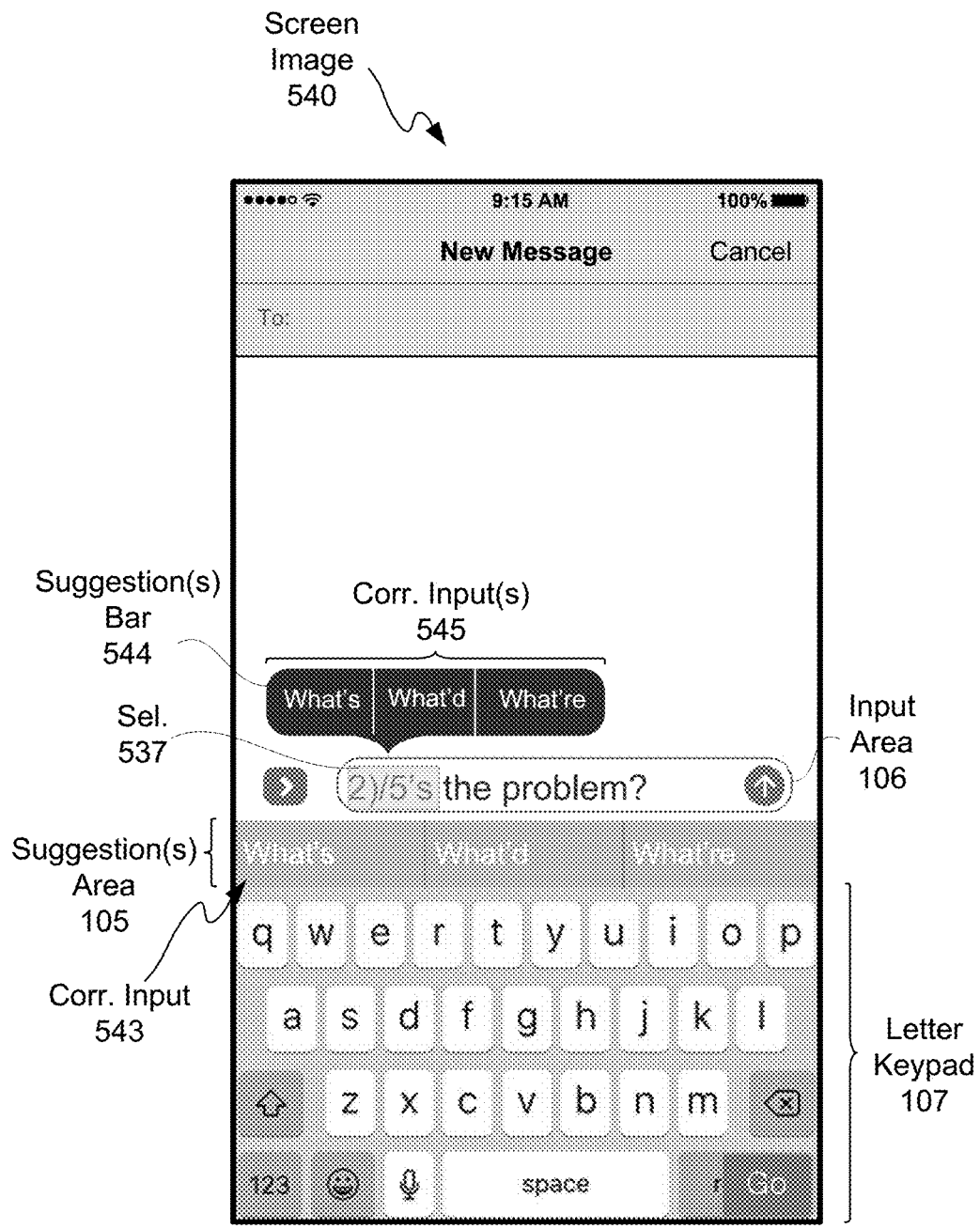
Figure 5:
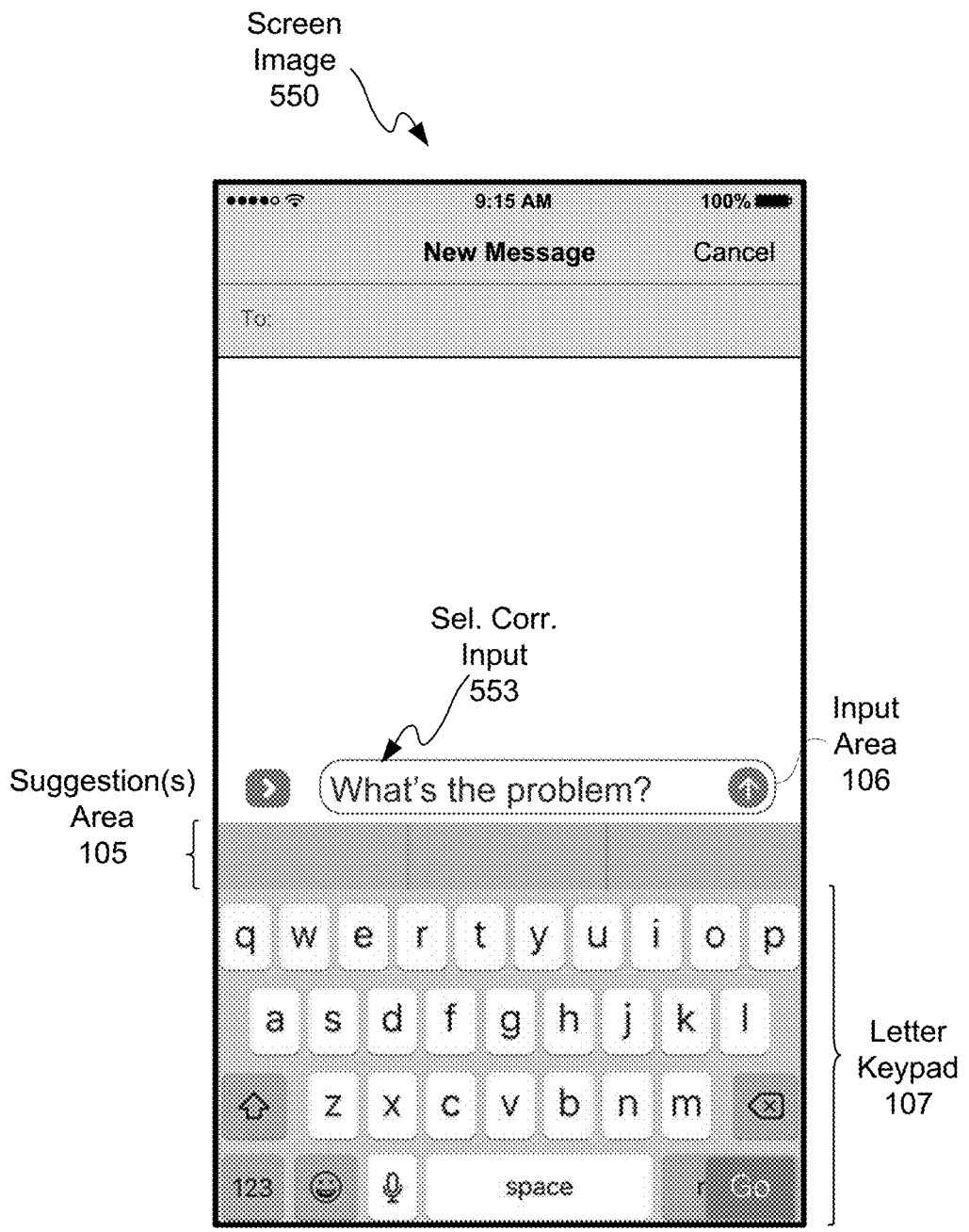

In some instances, a user may have already switched back to an intended keypad. For purposes of clarity by way of example and not limitation, FIGS. 5-1 through 5-5 are pictorial diagrams depicting alternate progressions of a screen image corresponding to an example of a keypad mode app flow 200 of FIG. 2.

With reference to screen image 510, a user input 512 may be provided via touch-sensitive input device in association with first keys of a first keypad. Such user input 512 may be displayed in an input area 106 of a user interface. However, typing of some keys, such as for example an apostrophe key, causes a keypad image to toggle. In this example, typing of an apostrophe caused a keypad image to toggle from a number-symbol keypad to a letter keypad 107. A user may thus not immediately notice the incorrect word in user input 512. User input 512 contains gibberish, which in this example is "2)/5"; however, in another example user input 512 may be some other string of characters.

Sensed information 117 for such a user input may be obtained. In response to sensed information 117, it may be determined that a portion of user input 512 was intended to be for a second keypad, such as letter keypad 107 for example, different from a first keypad previously displayed. Along those lines, sensed information 117 may be associated with second keys of a second keypad, such as letter keypad 107 for example, to obtain a representation of a portion of user input 512.

With reference to screen image 520, a command bar 524 may be displayed to provide one or more commands 525 positioned with reference to a portion of user input 512 containing gibberish. A select command 526 may be selected by a user to select such gibberish portion of user input 512.

With reference to screen image 530, responsive to selection of a select command 526 by a user, a selected gibberish portion 537 of user input 512 may be highlighted and another command bar 534 may be displayed. Command bar 534 may include commands 535, which may include a replace command 536. Responsive to selection of replace command 536, a selected gibberish portion 537 may be referenced against a dictionary associated with a second keypad, such as letter keypad 107 for example, to obtain at least one corresponding input 543, such as depicted in screen image 540. In this example, possible corresponding inputs 543 to selected gibberish portion "2)/5's" are "What's", "What'd" and "What're".

Corresponding inputs 543 may be displayed in screen image 540 in a suggestion(s) area 105 of a user interface. Optionally, one or more of corresponding input(s) 545, which may include one or more of corresponding inputs 543, may optionally be displayed on a suggestions bar 544.

With reference to screen image 550, responsive to user selection of a corresponding input, such selected corresponding input 553 may be displayed along with other of user input 512, in input area 106. Thus, a user need not re-input all of user input 512 to correct a gibberish portion thereof.

Figure 6:
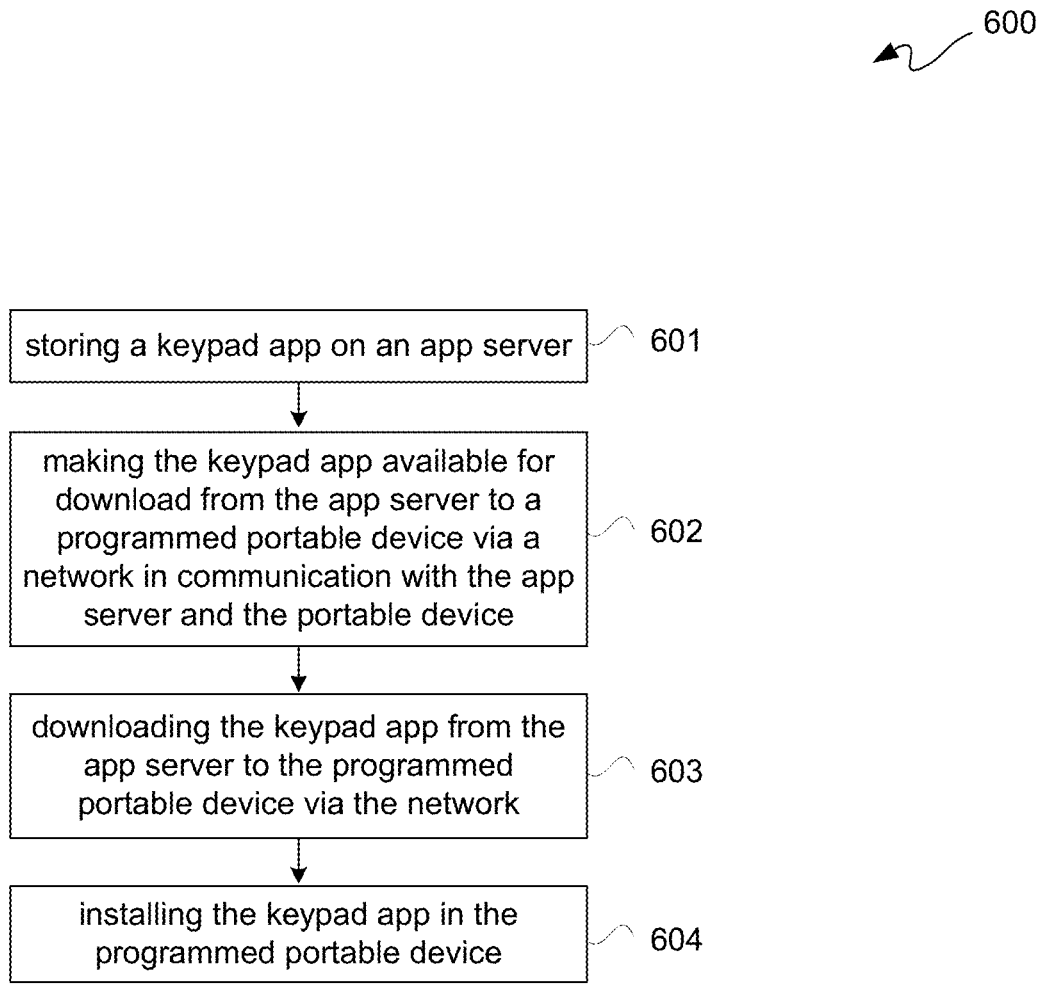
FIG. 6 is a flow diagram depicting an exemplary installation flow of a keypad app.

FIG. 6 is a flow diagram depicting an exemplary installation flow 600 of a keypad app. Again, for purposes of clarity by way of example and not limitation, such a keypad app is for a programmed portable device having a display and a touch-sensitive input device.

At operation 601, a provider stores a keypad app on an app server. At operation 602, such provider makes such a keypad app available for download from such an app server to such programmed portable device. Such download may be via a network, which may include a portion of the Internet, in communication with such app server or a gateway therefor and such portable device.

At operation 603, such a keypad app may be downloaded from such app server to such programmed portable device via such network. At operation 604, such keypad app may be installed in such programmed portable device. Such keypad app includes instructions to be carried out by such programmed portable device.

Figures 1, 7:
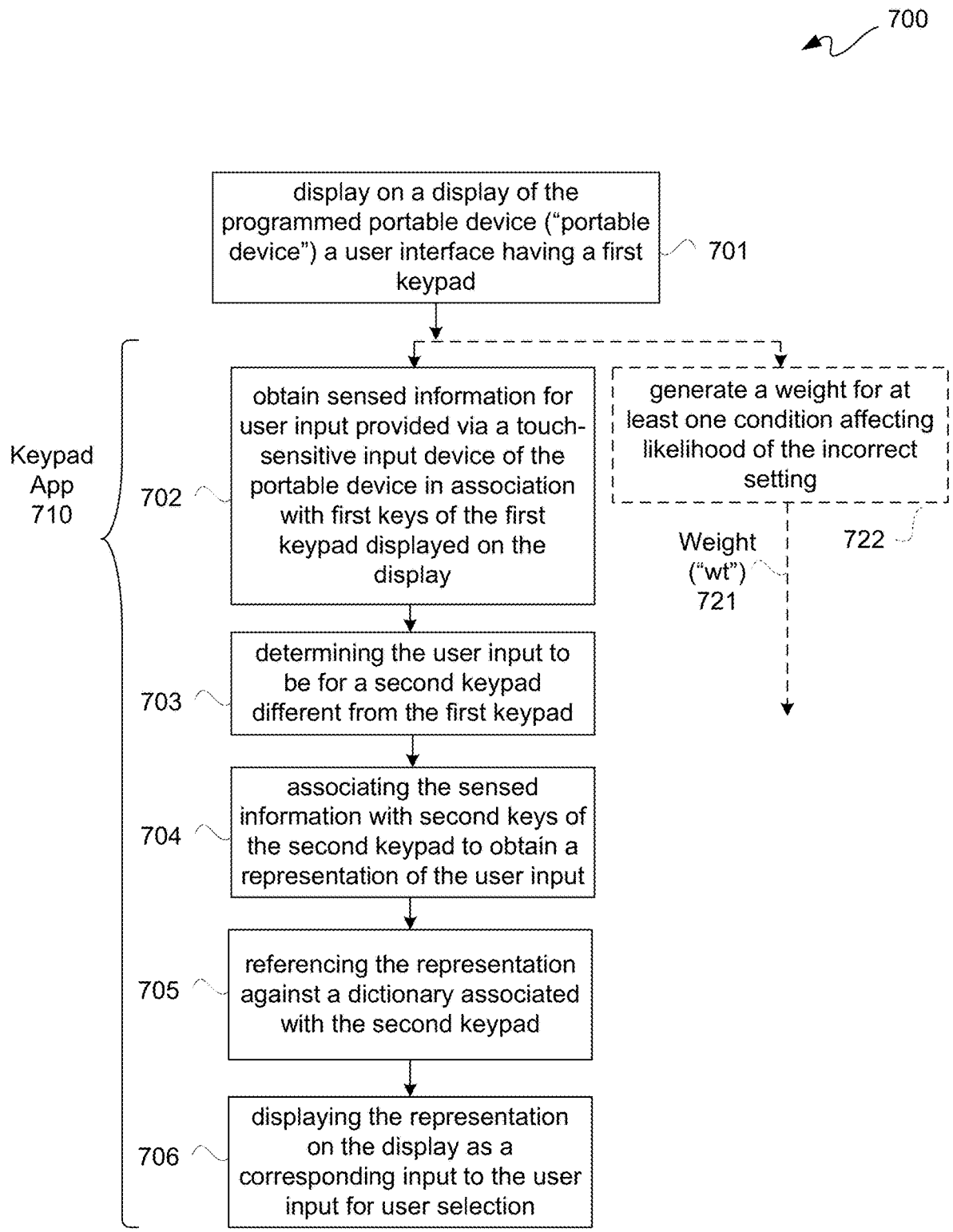
Figures 2, 7:
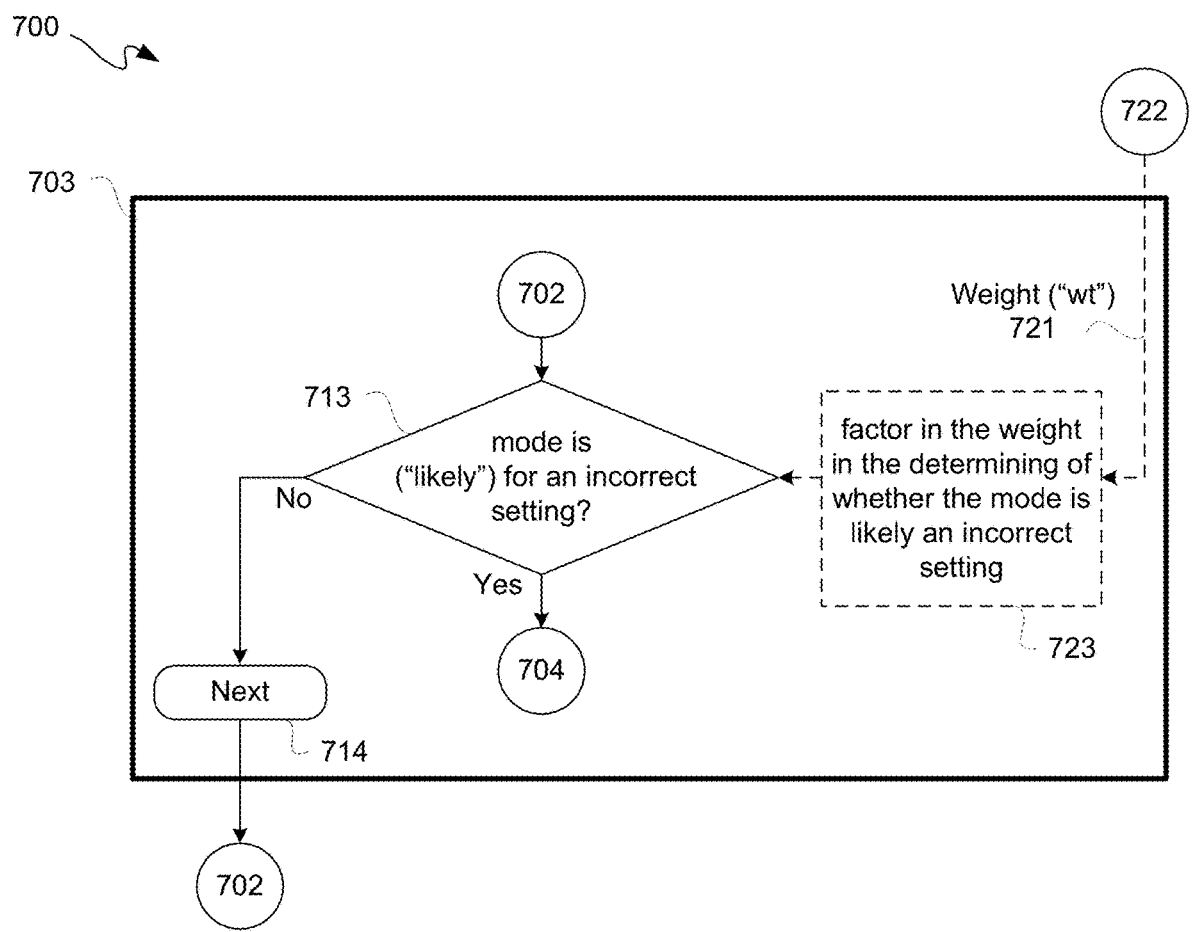

FIGS. 7-1 and 7-2 is a flow diagram depicting an exemplary keypad app use flow 700. At operation 701, a user interface having a first keypad may be displayed on a display of such a programmed portable device, and such display of such a first keypad may cause initiation of such a keypad app 710. Keypad app 710 may include instructions for operations 702 through 706, as well as optional instructions as described below.

At operation 702, sensed information 117 may be obtained, such as from storage for example, for a user input provided via the touch-sensitive input device in association with first keys of a first keypad on a display of a portable device. At operation 703, such user input may be determined to be for a second keypad different from such first keypad.

At operation 704, such sensed information may be associated with second keys of such a second keypad to obtain a representation of such user input. At operation 705, such representation may be referenced against a dictionary associated with such second keypad. For example, a check for representations, such as word(s) matching or likely matching such representation, in such dictionary may be performed. At operation 706, such representation may be displayed on a display as a corresponding input to user input for user selection.

Optionally, at operation 722, a weight 721 may be generated using at least one partial weight for at least one condition affecting likelihood of an incorrect setting of a user interface. Such weight 721 may optionally be used at operation 703, and may optionally be initiated in parallel with operation 702.

Operation 703 may include a determination operation 713 that a current mode is an incorrect mode or likely an incorrect mode, where such a current mode is associated with a first keypad and a corresponding dictionary. This determination may be made as previously described herein. Along those lines, sensed information 117 may be associated with currently displayed keys during such user input to initially obtain an initial representation of such user input. This initial representation may be referenced against a dictionary associated with a first or currently displayed keypad during such user input.

If such initial representation, including an exact or a likely match or a likely intended match, is not found in such first keyboard associated dictionary, then responsive to determining absence of such initial representation in such dictionary associated with such first keypad, operation 704 may be performed. If, however, such initial representation is found in such first keyboard associated dictionary, then such initial representation may be assumed to be for a correct mode, and operation may continue by obtaining incrementing sensed information, namely a next user input, at operation 714 and returning to operation 702.

Optionally, operation 723 may be performed to factor in weight 721 in determining of whether a current mode is likely for an incorrect setting displayed keypad. Weight 721 may be from one or more partial weights.

Figure 8:
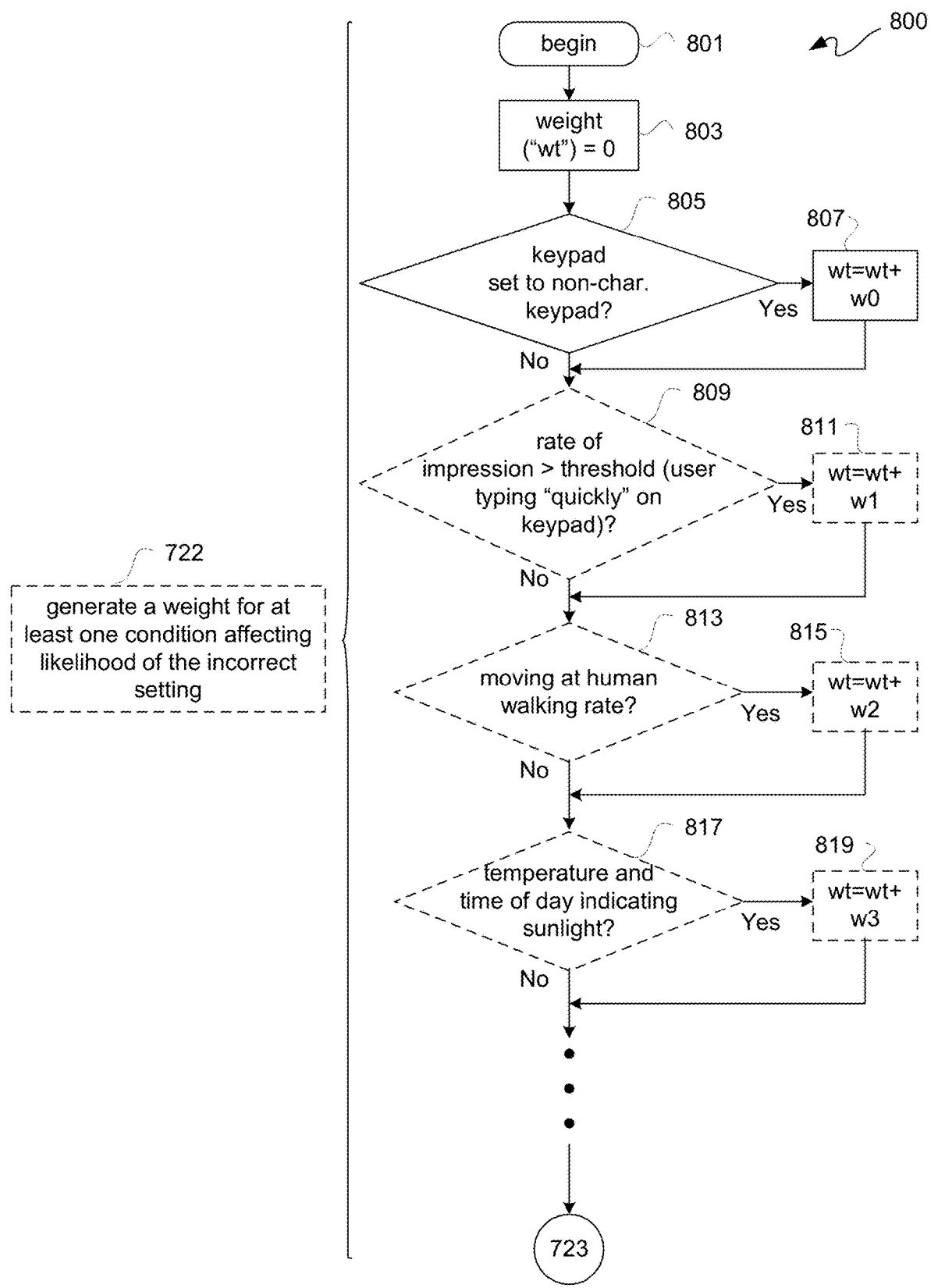
FIG. 8 is a flow diagram depicting an exemplary weight generation flow.

FIG. 8 is a flow diagram depicting an exemplary weight generation flow 800. Weight generation flow 800 may be for operation 722 for generation of a weight 721 indicating likelihood, or not, of an incorrect mode for a determination at operation 713. Such generated weight may be factored in at operation 723 for such determination at operation 713.

Weight generation flow 800 may begin at 801 followed by an initial setting of weight 721 to 0 at operation 803. At operation 805, it may be determined if a currently displayed keypad, namely a first keypad, is set to a non-character keypad, namely not a letter keypad for example. If a currently displayed keypad is determined at operation 805 to be a non-character keypad, a weight w0, associated with such condition, may be added to a current value of weight wt at operation 807. If a currently displayed keypad is a character keypad, then w0 is not added to a current value of weight wt.

At operation 809, it may be determined if a rate of impression or other input rate of a user input is greater than a threshold rate, such as for example indicating a user is typing "quickly" on a keypad. If a threshold rate is exceeded as determined at operation 809, then a weight w1, associated with such condition, may at operation 811 be added to a current value of weight wt. If a threshold rate is not exceeded as determined at operation 809, then w1 is not added to a current value of weight wt.

At operation 813, it may be determined if a programmed portable device is being moved at a human walking rate during receipt of user input, such as for example indicating a user is walking while typing on a keypad. If a programmed portable device is being moved at a human walking rate, namely a range therefor, during receipt of user input as determined at operation 813, then a weight w2, associated with such condition, may at operation 815 be added to a current value of weight wt. If a programmed portable device is not being moved at a human walking rate during receipt of user input as determined at operation 813, then w2 is not added to a current value of weight wt.

At operation 817, it may be determined if a programmed portable device is at a temperature, namely a range therefor, during a daylight time of day, such as for example indicating a user is typing while glare due to sunlight may be present. If a programmed portable device is at a temperature, namely a range therefor, during a daylight time of day as determined at operation 817, then a weight w3, associated with such condition, may at operation 819 be added to a current value of weight wt. If a programmed portable device is not at a temperature, namely a range therefor, during a daylight time of day as determined at operation 817, then w3 is not added to a current value of weight wt. A temperature range further may vary by device model, device material, and/or time of day. As this range may vary by one or more of such factors, software may be coded to take into account such one or more factors in setting a range indicating a user is typing while glare due to sunlight may be present.

Weights w0 through w3 are partial weights one or more of which may be used to weight likelihood that a user may not notice a currently displayed keyboard is incorrect for a user's intended input. One or more of these conditions and/or one or more other conditions may be used to weigh likelihood that a user does not notice a currently displayed keyboard is incorrect for a user's intended input.

Figure 9:
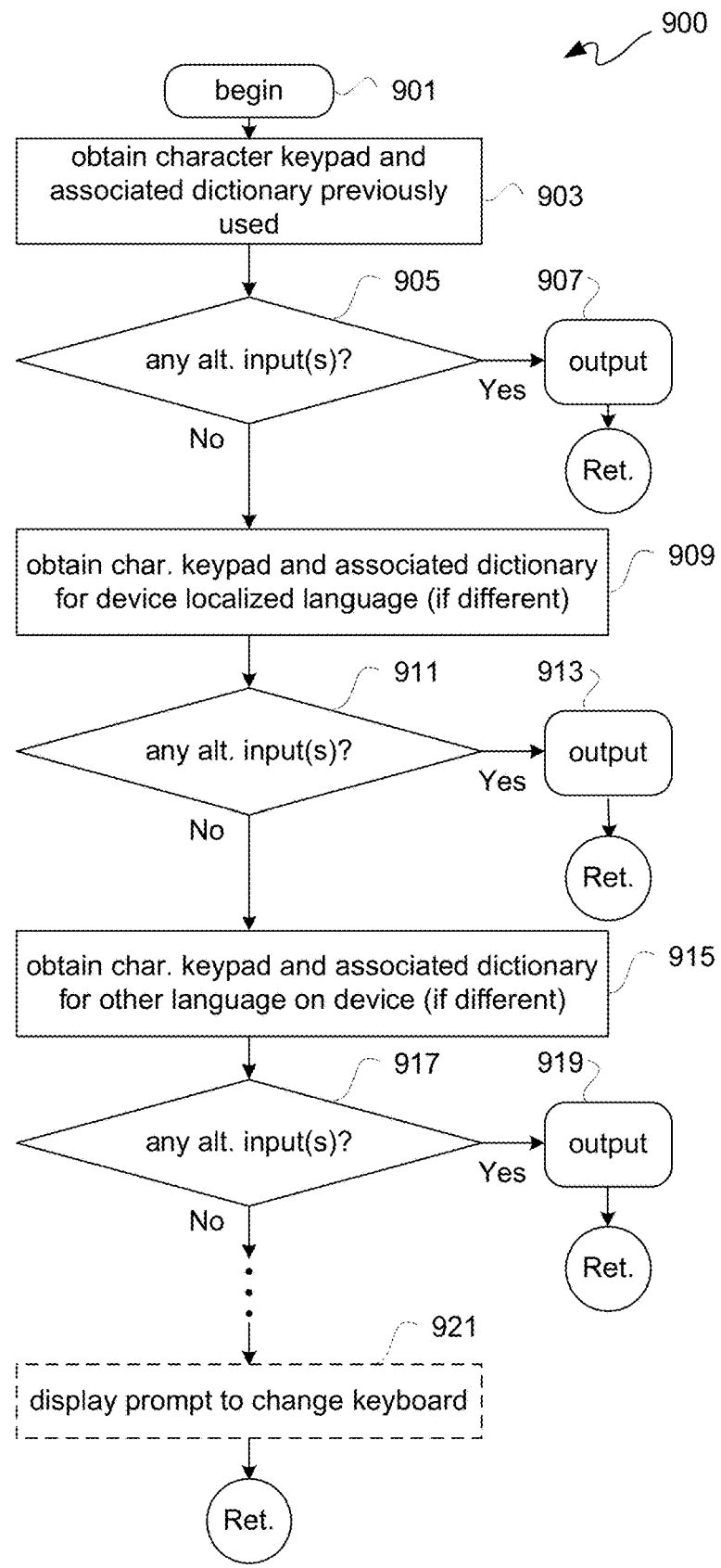
FIG. 9 is a flow diagram depicting an exemplary language mode determination flow.

FIG. 9 is a flow diagram depicting an exemplary language mode determination flow 900. Language mode determination flow 900 may be used for example for one or more operations of exemplary keypad app use flow 700. Language mode determination flow 900 may begin at 901.

At operation 903, a character keyboard and associated dictionary for a previously used language mode may be obtained. At operation 905, a search of such previously used associated dictionary may be performed for any alternative input to a representation of a user input. Any one or more alternative inputs found at operation 905 may be output at operation 907, and then language mode determination flow 900 may return to an operation calling up language mode determination flow 900. If no alternative input is found at operation 905, then language mode determination flow 900 may continue at operation 909.

At operation 909, a character keyboard and associated dictionary for a device localized language mode, if different than such previously used language mode, may be obtained. At operation 911, a search of such localized associated dictionary may be performed for any alternative input to a representation of a user input. Any one or more alternative inputs found at operation 911 may be output at operation 913, and then language mode determination flow 900 may return to an operation calling up language mode determination flow 900. If no alternative input is found at operation 911, then language mode determination flow 900 may continue at operation 915.

At operation 915, a character keyboard and associated dictionary for another language mode on a device, if different than such previously used language mode and localized language mode, may be obtained. At operation 917, a search of such other language associated dictionary may be performed for any alternative input to a representation of a user input. Any one or more alternative inputs found at operation 917 may be output at operation 919, and then language mode determination flow 900 may return to an operation calling up language mode determination flow 900. If no alternative input is found at operation 917, then language mode determination flow 900 may continue until all language possibilities are exhausted and then return. If no language is found for a representation of a user input, then optionally at operation 921 a user prompt to change a keyboard may be displayed.

Figures 1, 10:
Figures 2, 10:
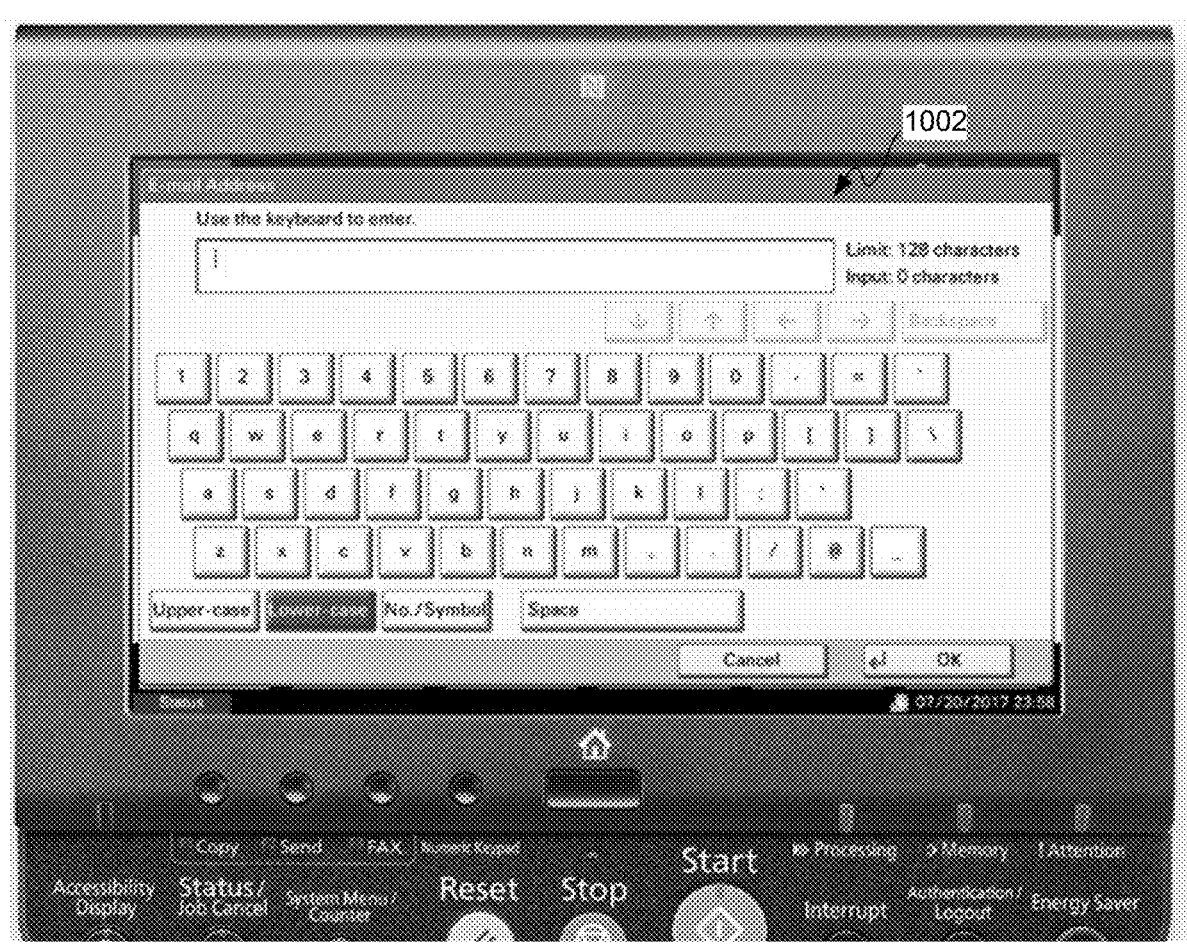
Figures 3, 10:
Figures 4, 10:
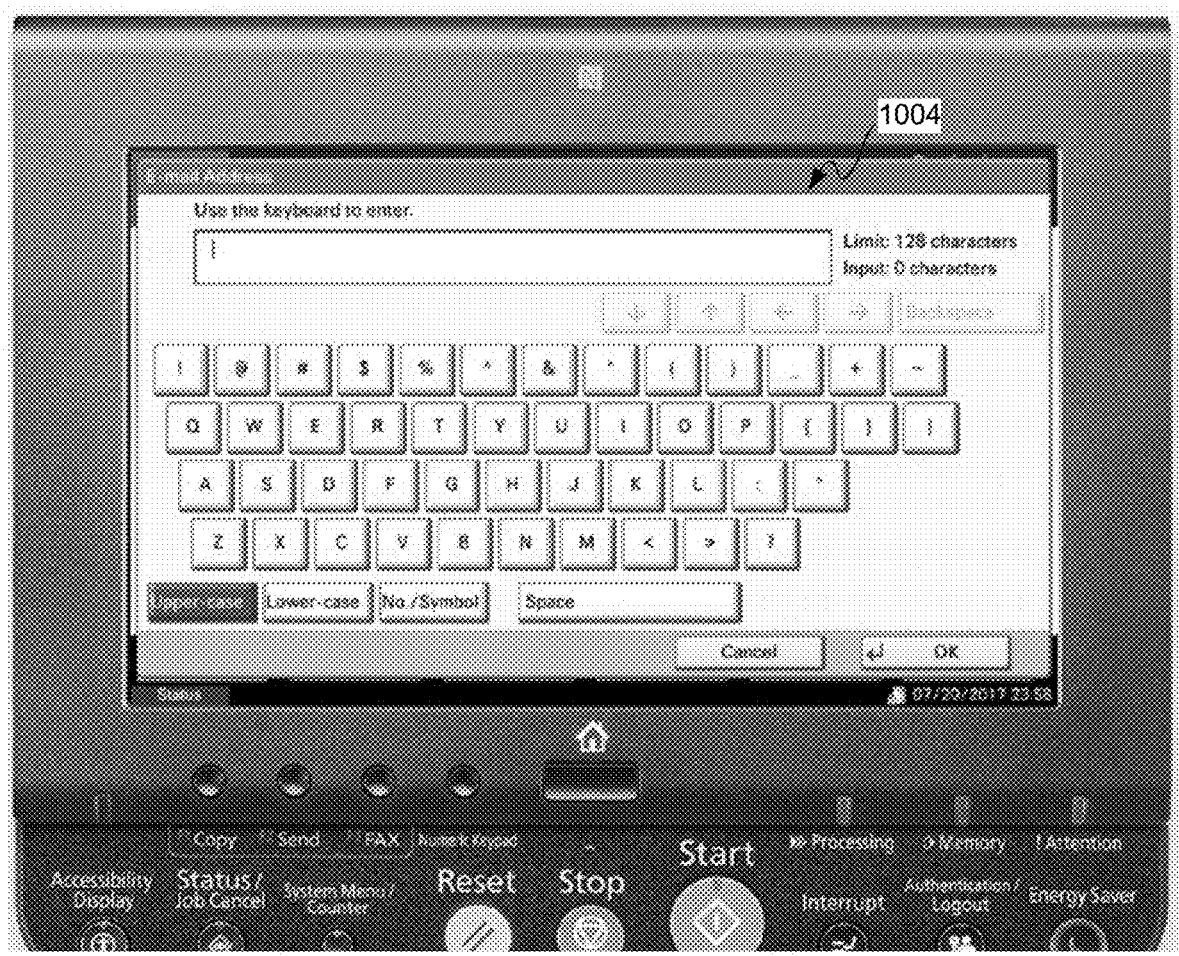

Though a mobile phone interface was described, it should be understood that other touch screens having a keypad user interface or other user interface may benefit from technology described herein. For example, FIGS. 10-1 through 10-4 are pictorial diagrams depicting an exemplary multi-function printer ("MFP") display 1000 having a touch screen with user interfaces respectively displayed. FIG. 10-1 is for a home user interface 1001 displayed on MFP display 1000. FIG. 10-2 is for a lowercase character keyboard user interface 1002 displayed on MFP display 1000. FIG. 10-3 is for a symbol keyboard user interface 1003 displayed on MFP display 1000. FIG. 10-4 is for an uppercase character keyboard user interface 1004 displayed on MFP display 1000. This is just one example of a user interface for an MFP, and other examples may be found, for example in U.S. Pat. No. 9,578,193. Accordingly, known details regarding an MFP are not described in unnecessary detail for purposes of clarity and not limitation.

Figure 11:
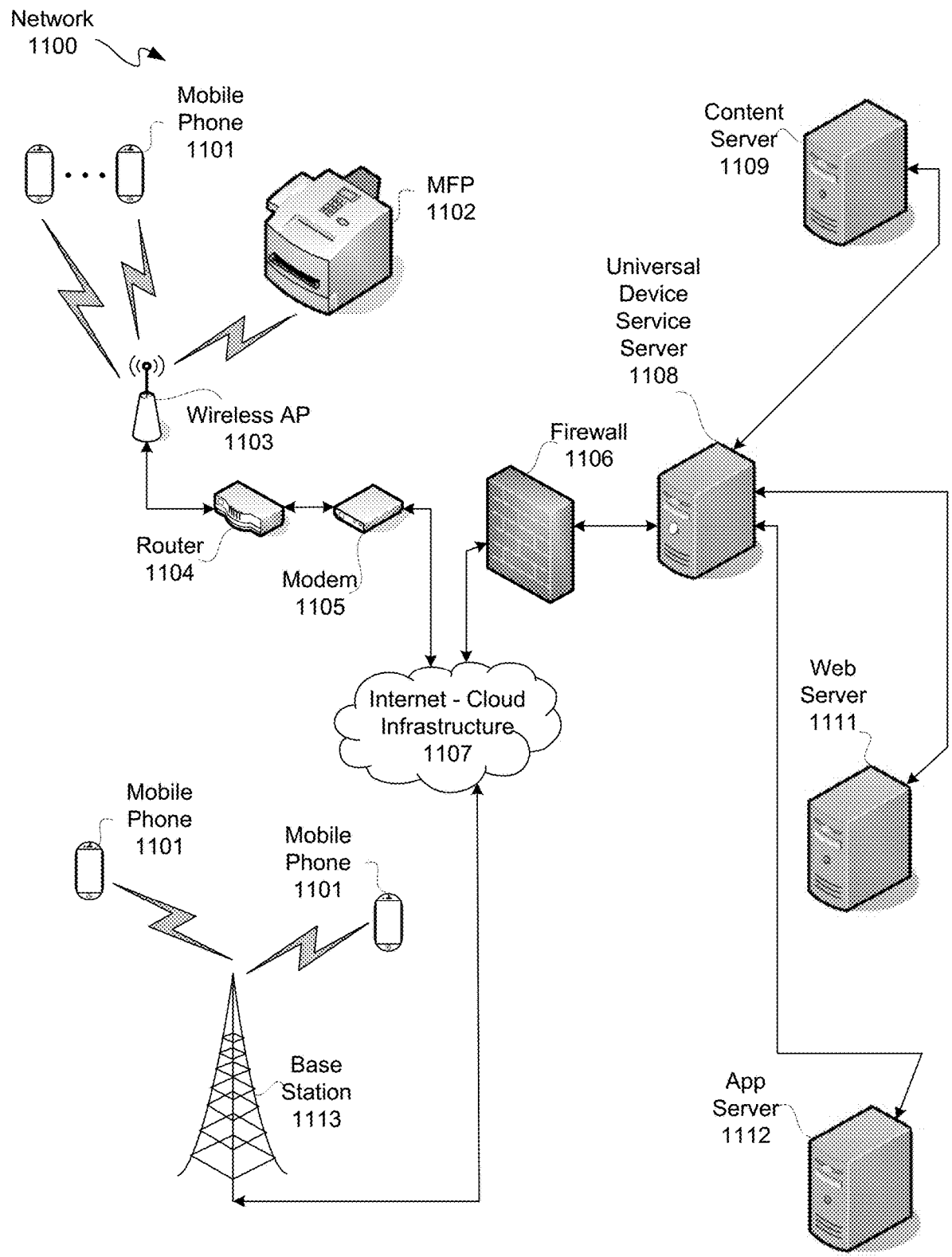
FIG. 11 is a pictorial diagram depicting an exemplary network.

Because one or more examples involve a network or networks, FIG. 11 is a pictorial diagram depicting an exemplary network 1100, which may be used to provide an app as described herein. Along those lines, network 1100 may include one or more mobile phones 1101 in wireless communication with wireless access point ("AP") 1103 and one or more mobile phones 1101 in communication with a base station 1113.

A MFP 1102 may be in wireless communication with wireless AP 1103. Wireless AP may be connected for communication with a router 1104, which in turn may be connected to a modem 1105. Modem 1105 and base station 1113 may be in communication with the Internet-Cloud infrastructure 1107.

A firewall 1106 may be in communication with the Internet-Cloud infrastructure 1107. Firewall 1106 may be in communication with a universal device service server 1108. Universal device service server 1108 may be in communication with a content server 1109, a web server 1111, and/or an app server 1112. App server 1112, as well as a network 1100, may be used for downloading a keypad app as described herein.

Accordingly, known details regarding networks are not described in unnecessary detail for purposes of clarity and not limitation.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. An apparatus for an electronic device having a display and an input device, comprising:
   a first keypad configured to be displayed on the display;
   a sensor interface configured to obtain information from the input device responsive to input in association with the first keypad;
   an app configured to cause the electronic device to:
      determine the input via the first keypad is for a second keypad different from the first keypad; and
      switch to display of the second keypad on the display;

wherein the app is configured to cause the electronic device to determine the information in association with the first keypad for a first language dictionary is incorrect and to determine the information is in association with the second keypad for a representation in a second language dictionary.

2. The apparatus according to claim 1, wherein the app is configured to cause the electronic device to display the representation of the input on the display responsive in association with the second keypad.

3. The apparatus according to claim 2, wherein the app is configured to cause the electronic device to obtain the representation from the second language dictionary in association with the second keypad.

4. The apparatus according to claim 3, wherein the app is configured to cause the electronic device to display a change keypad option on the display.

5. The apparatus according to claim 1, wherein the input device is a touch-sensitive input device of the electronic device.

6. The apparatus according to claim 1, wherein the information is sensed information.

7. The apparatus according to claim 6, wherein the app is configured to cause the electronic device to display the representation as a suggestion.

8. The apparatus according to claim 7, wherein the app is configured to cause the electronic device to switch to display of the second keypad responsive to selection of the suggestion.

9. The apparatus according to claim 8, wherein the electronic device is a printer.

10. The apparatus according to claim 8, wherein the electronic device is a mobile phone.

11. The apparatus according to claim 8, wherein the electronic device is a tablet.

12. The apparatus according to claim 8, wherein the electronic device includes a network interface for download of the app.

13. The apparatus according to claim 1, wherein the app is configured to cause the electronic device to determine a weight for the first keypad being correct for the input.

14. The apparatus according to claim 1, wherein the app is configured to cause the electronic device to determine a weight taking into account at least one condition factor of:
   an input rate of the input being greater than a threshold rate;
   a motion rate of the electronic device during receipt of the input; or
   a temperature of the electronic device.

15. The apparatus according to claim 14, wherein the app is configured to cause the electronic device to determine the weight taking into account each partial weight corresponding to the at least one condition factor therefor.

16. The apparatus according to claim 15, wherein the app is configured to cause the electronic device to use the weight to determine likelihood a user does not notice the first keyboard is not intended for the input.

17. The apparatus according to claim 16, wherein the electronic device is a printer.

18. The apparatus according to claim 16, wherein the electronic device is a mobile phone.

19. The apparatus according to claim 16, wherein the electronic device is a tablet.

* * * * *